(12) United States Patent
Yoshida et al.

(10) Patent No.: US 7,483,214 B2
(45) Date of Patent: Jan. 27, 2009

(54) LENS ARRAY SHEET, TRANSPARENT SCREEN, AND REAR-PROJECTION DISPLAY

(75) Inventors: Tsutomu Yoshida, Tokyo (JP); Kazuyoshi Ebina, Tokyo (JP); Takashi Abe, Tokyo (JP); Susumu Takahashi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 302 days.

(21) Appl. No.: 11/362,006

(22) Filed: Feb. 27, 2006

(65) Prior Publication Data

US 2006/0176569 A1 Aug. 10, 2006

Related U.S. Application Data

(63) Continuation of application No. 10/497,474, filed as application No. PCT/JP02/12655 on Dec. 3, 2002, now Pat. No. 7,054,068.

(30) Foreign Application Priority Data

Dec. 3, 2001 (JP) ............................. 2001-369216
Aug. 22, 2002 (JP) ............................. 2002-241309

(51) Int. Cl.
*G02B 27/10* (2006.01)
(52) U.S. Cl. ....................... 359/624; 359/455; 359/619; 359/626
(58) Field of Classification Search ................ 359/455, 359/619, 624, 626
See application file for complete search history.

(56) References Cited

U.S. PATENT DOCUMENTS 2,618,198 A * 11/1952 Luboshez .................... 359/456
4,548,469 A * 10/1985 Inoue et al. .................. 359/457
5,122,903 A   6/1992 Aoyama et al.

(Continued)

FOREIGN PATENT DOCUMENTS

JP         55-135830       10/1980

(Continued)

OTHER PUBLICATIONS

Japanese Patent Office Notice of Reasons for Rejection, mailed Feb. 19, 2008 and issued in corresponding Japanese Patent Application No. 2000-374787.

(Continued)

*Primary Examiner*—Joseph Martinez

(57) ABSTRACT

A lens array sheet, a transparent screen using the same, and a rear-projection display device are provided in which it is possible to control a perspective angle for the image in both a horizontal direction and a vertical direction without causing a problem in that a gain of a light is reduced by an optical absorption and an S/N ratio is reduced by an increased white dispersion. First lens and second lens arrays are formed by disposing a plurality of half-cylindrical lenses in parallel on a common plane such that longitudinal directions of the cylindrical lenses should be orthogonal to each other. A unified lens array layer and a shading layer in which a section through which a light does not transmit is formed on a focal plane of the lens array layer form a lens array sheet. Furthermore, fresnel lenses are combined so as to form a transparent screen.

10 Claims, 15 Drawing Sheets

U.S. PATENT DOCUMENTS 5,361,163 A     11/1994    Matsuda et al.
5,714,218 A *   2/1998    Nishio et al. ............... 428/64.1

FOREIGN PATENT DOCUMENTS

| | | |
|---|---|---|
| JP | 58-81526 | 6/1983 |
| JP | 61-110127 | 5/1986 |
| JP | H1-62539 | 4/1989 |
| JP | 3-278002 | 12/1991 |
| JP | 9-331203 | 12/1997 |
| JP | 11-24169 | 1/1999 |
| JP | 11-183706 | 7/1999 |
| JP | 11-344769 | 12/1999 |
| JP | 11-344770 | 12/1999 |
| KR | 1999-0046016 | 6/1999 |

OTHER PUBLICATIONS

Japanese Patent Office Action, mailed Jun. 5, 2007 and issued in corresponding Japanese Patent Application No. 2001-369216.

Notice of Reasons for Rejection issued in corresponding Japanese Patent Application No. 2001-369216, mailed on Aug. 21, 2007.

Office Action issued in corresponding Chinese Patent Application No. 02824122:3, on Aug. 24, 2007.

Office Action mailed on May 20, 2008 and issued in corresponding Japanese Patent Application No. 2000-374787.

Korean Office Action for corresponding Korean Patent Application No.:10-2004-7008343 dated Aug. 26, 2008 (pp. 1-4).

* cited by examiner

PRIOR ART

FIG.15

| | STRUCTURE OF SCREEN | | | MEASURED PERSPECTIVE ANGLE | | | | | | | |
|---|---|---|---|---|---|---|---|---|---|---|---|
| | | | | VERTICAL DIRECTION | | | | HORIZONTAL DIRECTION | | | |
| | FRESNEL LENS HAZE | RENTICULAR LENS (V) | RENTICULAR LENS (H) HAZE | α V 1/2 | β V 1/3 | γ V 1/10 | δ V 1/20 | α H 1/2 | β H 1/3 | γ H 1/10 | δ H 1/20 |
| COMPARATIVE EXAMPLE 1 | 0% | NO VERTICAL CYLINDRICAL LENS | 80% | 8 | 10 | 17 | 21 | 32 | 39 | 50 | 55 |
| COMPARATIVE EXAMPLE 2 | 60% | NO VERTICAL CYLINDRICAL LENS | 80% | 10 | 13 | 21 | 26 | 32 | 39 | 51 | 56 |
| EMBODIMENT 3-1 | 0% | ORTHOGONAL LENS 1 | 80% | 10 | 14 | 25 | 31 | 33 | 40 | 51 | 57 |
| EMBODIMENT 3-2 | 60% | ORTHOGONAL LENS 1 | 80% | 13 | 17 | 29 | 35 | 34 | 40 | 51 | 57 |
| EMBODIMENT 3-3 | 60% | ORTHOGONAL LENS 2 | 80% | 17 | 21 | 34 | 39 | 34 | 40 | 52 | 57 |

FIG.16

| | STRUCTURE OF SCREEN | | | SCREEN GAIN | CONTRAST | |
|---|---|---|---|---|---|---|
| | FRESNEL LENS | RENTICULAR LENS (V) | RENTICULAR LENS (H) | GAIN AT ZERO DEGREE | 200Lux | 0Lux |
| | HAZE | | HAZE | | | |
| COMPARATIVE EXAMPLE 1 | 0% | NO VERTICAL CYLINDRICAL LENS | 80% | 6 | 250 | 420 |
| COMPARATIVE EXAMPLE 2 | 60% | NO VERTICAL CYLINDRICAL LENS | 80% | 4 | 220 | 400 |
| EMBODIMENT 3-1 | 0% | ORTHOGONAL LENS 1 | 80% | 5 | 330 | 410 |
| EMBODIMENT 3-2 | 50% | ORTHOGONAL LENS 1 | 80% | 4 | 300 | 400 |
| EMBODIMENT 3-3 | 50% | ORTHOGONAL LENS 2 | 80% | 3 | 320 | 390 |

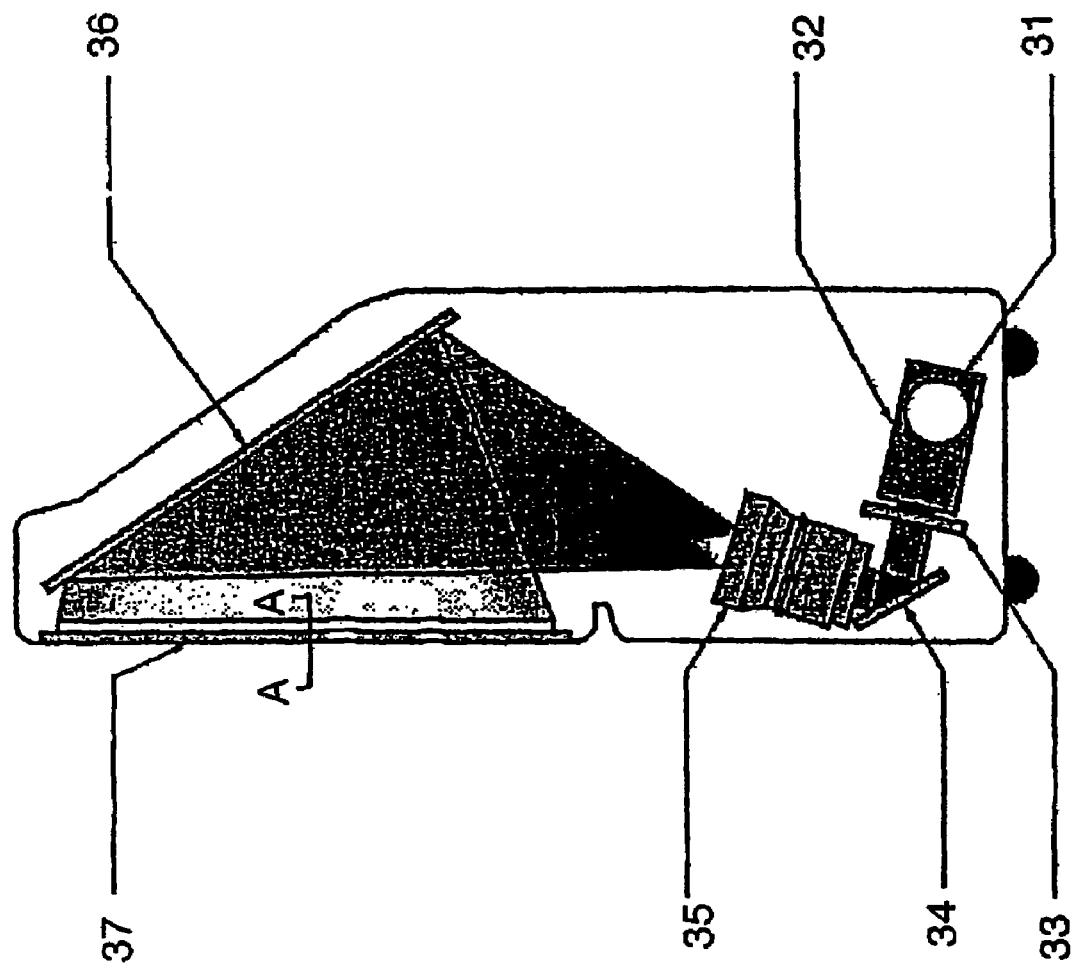

LENS ARRAY SHEET, TRANSPARENT SCREEN, AND REAR-PROJECTION DISPLAY

CROSS-REFERENCE TO RELATED APPLICATIONS

This application is a continuation of U.S. application Ser. No. 10/497,474 filed Jun. 1, 2004, now U.S. Pat. No. 7,054,068, pursuant to 35 U.S.C. § 120.

This application is also based upon and claims priority to PCT International Application Number PCT/JP02/12655, filed Dec. 3, 2002, Japanese Application No. 2001-369213, filed Dec. 3, 2001 and Japanese Application No. 2002-241309, filed Aug. 22, 2002, the contents of which are incorporated by reference herein.

BACKGROUND OF THE INVENTION

1. Field of the Invention

The present invention relates to a projection display such as a projection television and display. In particular, the present invention relates to a lens array sheet which is suitable for such a usage and a projection screen which uses such a lens array sheet.

It is possible to name a CRT, LCD (liquid crystal display device), DMD (Digital Micro-mirror Device; a trademark registered by Texas Instruments Corp.) for such a representative display such as a projection television in which an image which is emitted from a projector which is provided with various optical engine. In particular, a transparent (projection type, rear-projectiontype, rear type) projection television is representative.

Hereinafter, the present invention is explained for mainly a transparent projection screen.

2. Description of the Related Art

A screen is commonly known which is used for a projection television which is provided with a CRT projector having a structure shown in FIG. 10 for one of a conventional projection television screen.

Such a screen is provided with a lenticular sheet 320 which has concave sections and convex sections for forming lens sections on it both surfaces and two pieces of lens sheet member for a fresnel lens sheet 310 such that the lenticular sheet 320 is disposed nearer to an observing person than the fresnel lens sheet 310.

Also, there is a case in which a plane protecting board (not shown in drawings) may be disposed on an outermost position near the observing person.

The lenticular sheet 320 is formed by forming lens sections 322, 328 which are formed by disposing a plurality of cylindrical lens of which vertical direction is its longitudinal direction in a horizontal direction on both surfaces of the lenticular sheet 320. The lenticular sheet 320 has a lens section 328 for the observing person so as to adjust a color shift for an image light which is emitted from a three-tube projector which has colors such as R, G, and B by refracting and dispersing the image light and a lens section 322 near an emitting side compatibly. (Hereinafter, it may be called a double-surface lenticular sheet.)

It is common that the double-surface lenticular sheet 320 should be formed by an extruding method in which optical axes of the lens sections on both surfaces must be aligned.

On the other hand, not only a refracting and dispersing function in a horizontal direction by the above lens section (an image light is broadened in a horizontal direction by disposing the cylindrical lens group in the horizontal direction) but also a broadening function for the display image in also a vertical direction (enlarging a vertical perspective angle) are required in the projection screen.

An angle which is greater than 10 (ten) degree is required for a example for enlarging a vertical perspective angle (an angle which transmits from an orthogonal direction to a front surface-screen in a case in which a brightness of the displayed image light in the front surface may be reduced by a half when a viewpoint is moved from the front surface to an orthogonal direction) in a wide range.

Also, it is required in the projection screen that the displayed image light should be viewed in a high contrast. Also, it is necessary that a peripheral light other than the displayed image light should be reflected on the surface of the screen so as not disturb the observation and a shading layer 325 should be formed which is formed by a black stripe (BS) which corresponds to a non-light-condensing section in the cylindrical lens (that is, such as a non-transparent section for the image light) so as to have a smaller numerator in the above relationship.

As explained above, the double-surface lenticular sheet 320 is used for a projection television which is provided with a plurality of CRT projectors (in general, three sets such as R, G, and B).

On the other hand, there is a projection television which has only one set of projector (that is, a full-color display image is projected from a single lens) which is employs a method in which an LCD or a DMD is used for an optical engine section in the projector.

It is not necessary to compensate a color depositioned condition (color shift) of the image light for the R, G, and B in the screen for the projection-type projection television which has a single projector (which is called as a single-tube type). That is, it is acceptable only if the lens section which is formed by a cylindrical lens group should be disposed on a surface of the lens sheet because only emitting range (perspective angle) for the image light should be broadened (such a structure is called a single-surface lenticular sheet).

FIG. 11 is a view for explaining an example for a structure for a transparent screen which is used for a single-tube projection television.

Basically, the transparent screen formed by two members such as a lenticular sheet 370 and a fresnel lens sheet 360.

A lens section 71 is formed on only a surface of the lenticular sheet 370. Also, a shading layer 375 is formed on a plane surface on which the lens section 371 is not formed.

For a case of a screen which is provided with a single-surface lenticular sheet, it is required that the perspective angle should be enlarged in vertical direction as similarly to the above explained double-surface lenticular sheet.

FIG. 5 is a detailed view for an example of a structure for a conventional transparent screen which is used for a liquid crystal projection television etc. In the drawing, reference numeral 1 indicates a fresnel lens. The fresnel lens 1 is formed by disposing a lens layer 1b which has convex sections and concave sections on a surface of a plate base member layer 1a concentrically. Generally, the projector is disposed near the base member layer 1a in the liquid crystal projection television.

In addition, a lenticular sheet 2 is disposed near the lens layer 1b in the fresnel lens 1; thus, the transparent screen is formed by the fresnel lens 1 and the lenticular sheet 2.

For example, a structure of the lenticular sheet 2 is generally formed by a lenticular layer 3, a photo-sensitive resin layer 5, a shading layer 6, a bonding agent layer 7, and a dispersing layer 8 in which the lenticular layer 3 is disposed in the fresnel lens 1 and the dispersing layer 8 is disposed near the observing person. Here, a hard coat layer 9 is disposed on a surface of the dispersing layer 8 which is near the observing person according necessity so as to protect the surface.

The lenticular layer 3 is formed a plate base member layer 3a and a lens layer 3b which is disposed on its surface. The lens layer 3b is formed by disposing a plurality of half-cylindrical lenses 4 such that the longitudinal direction should be in parallel and a cylindrical surface 4a should be disposed near the fresnel lens 1.

Hereinafter, an example for a manufacturing operation for the structure of the lenticular sheet 2 is explained.

For manufacturing the lenticular layer 3, a lenticular layer 3b is formed by disposing a radiation curable resin under a non-hardened condition between a surface of the base member layer 3a and a mold (stamper) which has a reverse shape of the lens layer 3b, emitting a predetermined radiation from other surface of the base member layer 3a, and hardening the above resin. Also, the above lens layer 3b is bonded on the base member layer 3a; thus, a lenticular layer 3 is obtained.

Next, a photo-sensitive resin layer 5 is applied on a surface of the lenticular layer 3 near the base member layer 3a.

For such a photo-sensitive resin layer 5, it is possible to name a member which has a characteristic in which it is adhesive under non-exposed condition and the adhesiveness disappears after being exposed and degenerated.

In addition, when a light is emitted from the lens array 3b via the fresnel lens 1 as similar to a case in which the transparent screen is used, a beam in a stripe manner is emitted so as to be condensed on the photo-sensitive resin layer 5 via the lenticular layer 3. In addition, the photo-sensitive resin layer 5 in a section which is exposed is denatured; thus the adhesiveness disappears. In addition, a transcription film which has a black transcription layer such as a black carbon is pressed on the photo-sensitive resin layer 5, the transcription layer is transcribed on an unexposed section which has an adhesiveness; thus, a shading layer 6 in a stripe manner in which a plurality of black lines are disposed is formed.

That is, a light is shaded by the shading layer 6 in a section through which the light does not transmit.

After that, plate dispersing layer 8 is further layered via a film adhesive layer 7 so as to be unified tightly; by doing this, a lenticular sheet 2 is obtained. Here, the dispersing layer 8 is formed by mixing a dispersing member which is formed by a plurality of glass beads in a matrix which is made of a plastic member such as an acrylic member.

In addition, a hard coat layer 9 is layered on a surface of the dispersing layer 8 according to necessity so as to be unified.

In addition, if the transparent screen is attached to a liquid crystal projector which is provided with a projector as shown in FIG. 5 and the light is emitted from the projector, the light becomes an approximate parallel light via the fresnel lens 1. In addition, a predetermined optical distribution angle is added by transmitting the light through the lenticular layer 3 such that the light disperses in a horizontal direction in the image appropriately; thus, the perspective angle is controlled in this direction. Here, the light which transmits through the lenticular layer 3 becomes a stripe light which is parallel with a longitudinal direction of the cylindrical lens. Furthermore, a light disperses in a vertical direction appropriately by the function of the dispersing layer 8 via the shading layer 6; thus, the perspective angle is controlled in this direction. Here, it is possible to improve S/N ration by the shading layer 6; thus, it is possible to provide an image which has a desirable contrast.

As explained above, a lenticular layer and a dispersing layer are used in a combined manner so as to control the perspective angle of the image in a horizontal direction and a vertical direction in a conventional lenticular sheet and a transparent screen. However, there have been problems such as a reduced gain (brightness) which is caused by a light absorption in the dispersing layer and a reduced S/N ration caused by the increase in a white dispersion.

Also, a method can be provided for controlling the perspective angle in the horizontal direction and the vertical direction by disposing the cylindrical lenses such that each longitudinal direction should be orthogonal to each other on both sides when two pieces of lenticular sheets are overlapped such that each longitudinal direction should be orthogonal to each other or a plurality of the cylindrical lenses are disposed on both surfaces of a base member layer.

However, in the former case, it is necessary to control the relationship of two lenticular sheets strictly so as to maintain the optical characteristics in two lenticular sheets. Also, it is necessary to form a lens in a fine forming operations under condition that it is necessary to used the material member for forming the cylindrical lens twice as many as the conventional case substantially; therefore, there has been a problem that the cost for the material member and the cost for forming the material member are expensive.

In a latter case, the cylindrical lens groups of which disposition direction are different from each other must be formed on both surfaces of one piece of the base material layer. Therefore, as similarly, it is necessary to perform the forming operations for the lens section twice.

Furthermore, there is a method in which a plurality of independent lenses or prisms which can add the distribution angle in both the vertical direction and the horizontal direction are disposed on a surface of the base member layer as similar to a micro-lens array. However, it is necessary to perform a complicate forming operation and it is difficult to increase an area and perform a fine pitch operation. Also, productivity is low. Therefore, the cost increases inevitably.

Furthermore, in Japanese Unexamined Patent Application, First Publication No. Hei 9-311203, a lenticular lens sheet is disclosed is disclosed which forms a lens plate in which a plurality of lenticular lens elements (cylindrical lenses) which have lenticular lens shape on incident surface and fine lenticular lens shapes which are formed by a molding operation so as to be orthogonal with each other along surfaces of the cylindrical lenses.

As explained above, there is a problem to be solved in the transparent projection television for enlarging the perspective angle in the vertical direction and improving the contrast.

A dispersing layer which is formed by dispersing the optical dispersing particle and lenticular layer are used in a combined manner so as to control the perspective angle of the image in a horizontal direction and a vertical direction in a conventional lenticular sheet and a transparent screen.

However, in the above optical dispersing layer, if an optical dispersing agent (particle) is used excessively, there have been problems in that a gain (brightness) is reduced by an optical absorption and an S/N ration is reduced by an increase in a white dispersion.

Also, a diameter of a projection pupil in a projection lens is small in the transparent projection television which is provided with a liquid crystal projector. Therefore, as compared with a CRT transparent projection television, there have been inherent problems in that the brightness of the incident light from the projector is partially high (hot spot), the cylindrical lens may be observed to be bright in a stripe manner in a disposing direction (hot bar), and an unnecessary scintillation which is observed in a projection image may occur frequently.

Furthermore, it is not possible to solve these problems sufficiently only by enlarging the perspective angle in the vertical direction, a hot spot, a hot bar, and a scintillation by enhancing the optical dispersion characteristics by using an optical dispersing agent (particle). That is, it is newly required to add a dispersion angle by a lens function.

SUMMARY OF THE INVENTION

The present invention was made in consideration of the above problems. An object of the present invention is to provided a transparent screen in which there are fewer optical absorption and reduction in the gain (brightness) so as to restrict the white dispersion.

Furthermore, another object is to provide a transparent screen of which production cost is cheap.

In order to solve the above problems, the invention of a first aspect of the present invention is a lens array sheet which is provided with a lens array layer which has a unified lens array wherein first lens arrays and second lens arrays which are formed by disposing a plurality of half-cylindrical lenses so as to cross each other orthogonally on a common plane.

The invention of a second aspect of the present invention is a lens array sheet in which the first lens array is as high as the second lens array.

The invention of a third aspect of the present invention is a lens array sheet in which the height of the first lens is different from the height of the second lens array.

The invention of a fourth aspect of the present invention is a lens array sheet in which shading sections for shading a transmitting light are provided on a focal plane of the lens array layer.

The invention of a fifth aspect of the present invention is a lens array sheet in which a cross section of the cylindrical lens is aspherical.

The invention of a sixth aspect of the present invention is a lens array sheet in which the lens array layer is formed by a base material layer and a lens layer which is disposed on a surface of the lens array layer, and the lens layer is formed by a radiation curable resin.

The invention of a seventh aspect of the present invention is a transparent screen which is provided with a lens array sheet according to any one of the first to fourth aspects.

The invention of an eighth aspect of the present invention is a transparent screen according to the fifth aspect in which the fresnel lens is formed by a base material layer and a lens layer which is formed on a surface of the fresnel lens layer is formed by a radiation curable resin.

The invention of a ninth aspect of the present invention is a rear-projection display device according to the seventh aspect or the eighth aspect further comprising the transparent screen.

The invention of a tenth aspect of the present invention is a lens array sheet in which a first lens array which is formed by half-cylindrical lenses in parallel and half-cylindrical lenses which is formed by half-cylindrical lenses in parallel are disposed on a same plane such that longitudinal directions of the cylindrical lenses are orthogonal, the lens array is provided with a lens array layer which has a unified lens layer, and a plurality of cylindrical lenses are disposed so as to have intervals in parallel in either one of the first lens array or the second lens array.

In the invention of an eleventh aspect of the present invention, a valley section in the first valley section and a valley section in the second lens array may be disposed so as to coincide with each other.

Also, as a twelfth aspect of the present invention, it may be acceptable if a shading layer is provided on a focal plane of the lens array so as to block the transmitting light.

In a thirteenth aspect of the present invention is a lens array sheet any one of the tenth aspect to twelfth aspect in which a plurality of cylindrical lenses are disposed in parallel without intervals in either one of the first lens array or the second lens array in which a plurality of cylindrical lenses are disposed in parallel with intervals.

Furthermore, in a lens array sheet of a fourteenth aspect of the present invention, it is acceptable if the cross section of the cylindrical lens in the first lens array may be aspherical in the lens array sheet.

Also, as a fifteenth aspect of the present invention, it is acceptable if the lens array layer is disposed on a surface of the base material layer and the lens array layer is formed by a radiation curable resin.

Also, as a sixteenth aspect of the present invention, a rear-projection display device which is provided with the above aspect of the transparent screen is provided.

Also, as a seventeenth aspect of the present invention, a lens array sheet is provided in which a first cylindrical lens which is formed by disposing a plurality of half-cylindrical lenses in parallel and a second lens array which is formed by disposing a plurality of half-cylindrical lenses in parallel are disposed on a same plane so as to be orthogonally approximately in longitudinal directions of the cylindrical lens in a lens array layer which has a unified lens layer, a peak of unit lens in the first lens array is continuous over the longitudinal direction, the second lens array is disposed by forming the unit lenses the peak of which is not continuous over a longitudinal direction between the peaks of the neighboring unit lenses in the first lens array.

Also, an eighteenth aspect of the present invention is a transparent screen which is provided with the above lens array sheet.

Furthermore, as a nineteenth aspect of the present invention, the transparent screen of the present invention can be formed by the above lens sheet and the fresnel lens.

In the twentieth aspect of the present invention, a lens array sheet which is provided with a lens array layer which has a unified lens layer (hereinafter called an orthogonal lens section) is employed in which two lenticular sheets are not layered so as to be orthogonal in the longitudinal direction of the cylindrical lenses, nor the cylindrical lenses are disposed on both surfaces of the base member layer so as to be orthogonal in the longitudinal direction. Instead, the first lens array and the second lens array are disposed so as to be approximately orthogonal in the longitudinal direction of the cylindrical lenses on only one surface of a piece of the lens sheet.

In a lens array sheet according to a twenty-first aspect of the present invention, a first cylindrical lens which is formed by disposing a plurality of half-cylindrical lenses in parallel and a second lens array which is formed by disposing a plurality of half-cylindrical lenses in parallel are disposed on a same plane so as to be orthogonally approximately in longitudinal directions of the cylindrical lens in a lens array layer which has a unified lens layer, a peak of unit lens in the first lens array is continuous over the longitudinal direction, and the second lens array is disposed by forming the unit lenses the peak of which is not continuous over a longitudinal direction between the peaks of the neighboring unit lenses in the first lens array.

In a twenty-second aspect of the present invention, at least the first lens array or the second lens array may be disposed in parallel via a plane section between the unit lenses. Also, it may be acceptable if the unit lenses are disposed without intervals therebetween.

In a twenty-third aspect of the present invention, the optical distribution characteristics (dispersion characteristics) may be designed differently in the unit lens in the first lens array and the second lens array.

In a twenty-fourth aspect of the present invention, the feature of the present invention which is designed for a suitable screen is that the first lens array is a lenticula (horizontal lenticular) which is formed by disposing cylindrical lens group in a horizontal direction so as to have a dispersing (distributing) characteristics in a horizontal direction, the second lens array is a lenticular (vertical lenticular) which is formed by disposing the cylindrical lens group in the vertical direction so as to have a vertical dispersing (distributing) characteristic. A relationship such as dispersion characteristics by the first lens array>dispersion characteristics by the second lens array is effective. Also, a half angle αV (a measured angle in which a brightness of an emitted light which is measured orthogonally from a front surface to a lens array sheet is as a half as the half angle which is measured in an offset manner from the orthogonal condition) in the second lens array in a vertical direction is not fewer than 10 degree, and a perspective angle δV (a measured angle in which a brightness of an emitted light which is measured orthogonally from a front surface to a lens array sheet is as a twentieth half as the perspective angle which is measured in an offset manner from the orthogonal condition) in the second lens array in a vertical direction is not fewer than 35 degree.

In a twenty-fifth aspect of the present invention, the lens layer of the lens array sheet and an opposite surface are plane surfaces, and a shading layer is formed on the plane surface to which a light is not condensed by the lens layer.

In a twenty-sixth aspect of the present invention, the shading layer is formed by an aperture section which is continuous in a stripe manner according to the first lens array and an aperture section which is not continuous in an approximate spot manner according to the second lens array (each spot is in a stripe manner according to a light condensing section in the cylindrical lens).

A ratio of the shading layer on the plane surface is suitable between 30% and 90%.

Also, in a twenty-seventh aspect of the present invention, it is preferable to form a lens layer by a hardened product of radiation curable resin on a surface of a plane base member which is formed by radiation transmittable base material for a fine pitch lens array.

In a twenty-eighth aspect of the present invention, the above lens array sheet is combined with a fresnel lens sheet which has a function for emitting the projection light from the projector in an approximate parallel light so as to form a transparent projection screen.

In a twenty-ninth aspect of the present invention, the optical dispersing layer which is formed by dispersing the optical dispersing particle is formed in at least any section of the fresnel lens sheet and the lens array sheet for a common example for the transparent projection screen.

In a thirtieth aspect of the present invention, a shading pattern (black matrix=BM) is formed according to a "self-alignment method" in which a light condensing section/non-light condensing section forms an aperture section/shading section according to a light condensing characteristics in the lens itself so as to realize a high shading ratio; thus, it is advantageous for improving the contrast.

BRIEF DESCRIPTION OF DRAWINGS

FIG. 15 is a table for a comparison between the present invention and a comparative example with regard to an optical characteristic (perspective view characteristic).

FIG. 16 is a table for a comparison between the present invention and a comparative example with regard to an optical characteristic (contrast).

FIG. 17 is a rear-projection display device which is provided with a transparent screen which uses the lens array sheet of the present invention.

DETAILED DESCRIPTION OF THE PREFERRED EMBODIMENTS

First Embodiment

Figure 1:
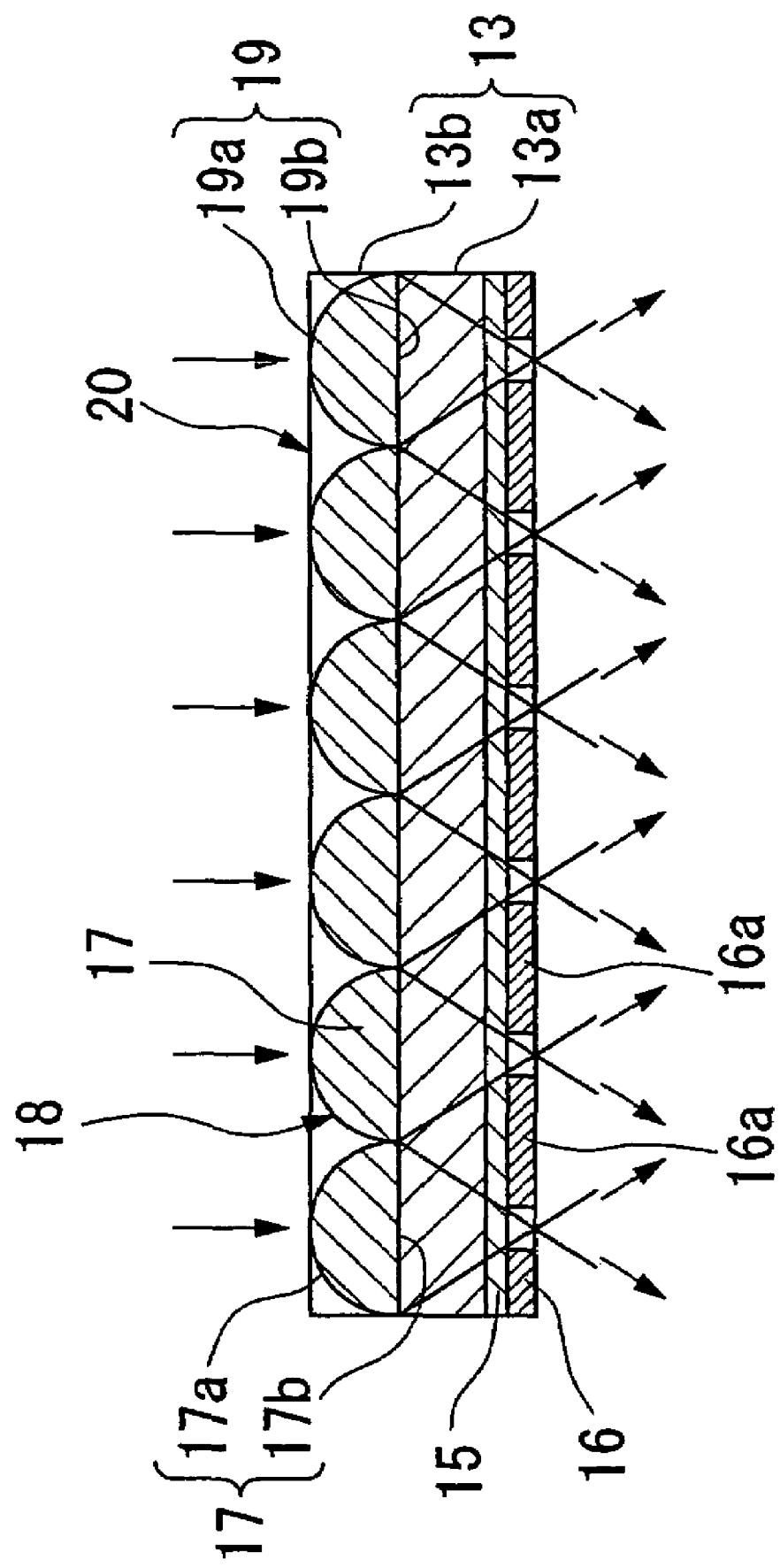
FIG. 1 is a cross section for a lens array layer and a shading layer which form an example for a lens array sheet of the present invention.
Figure 2:
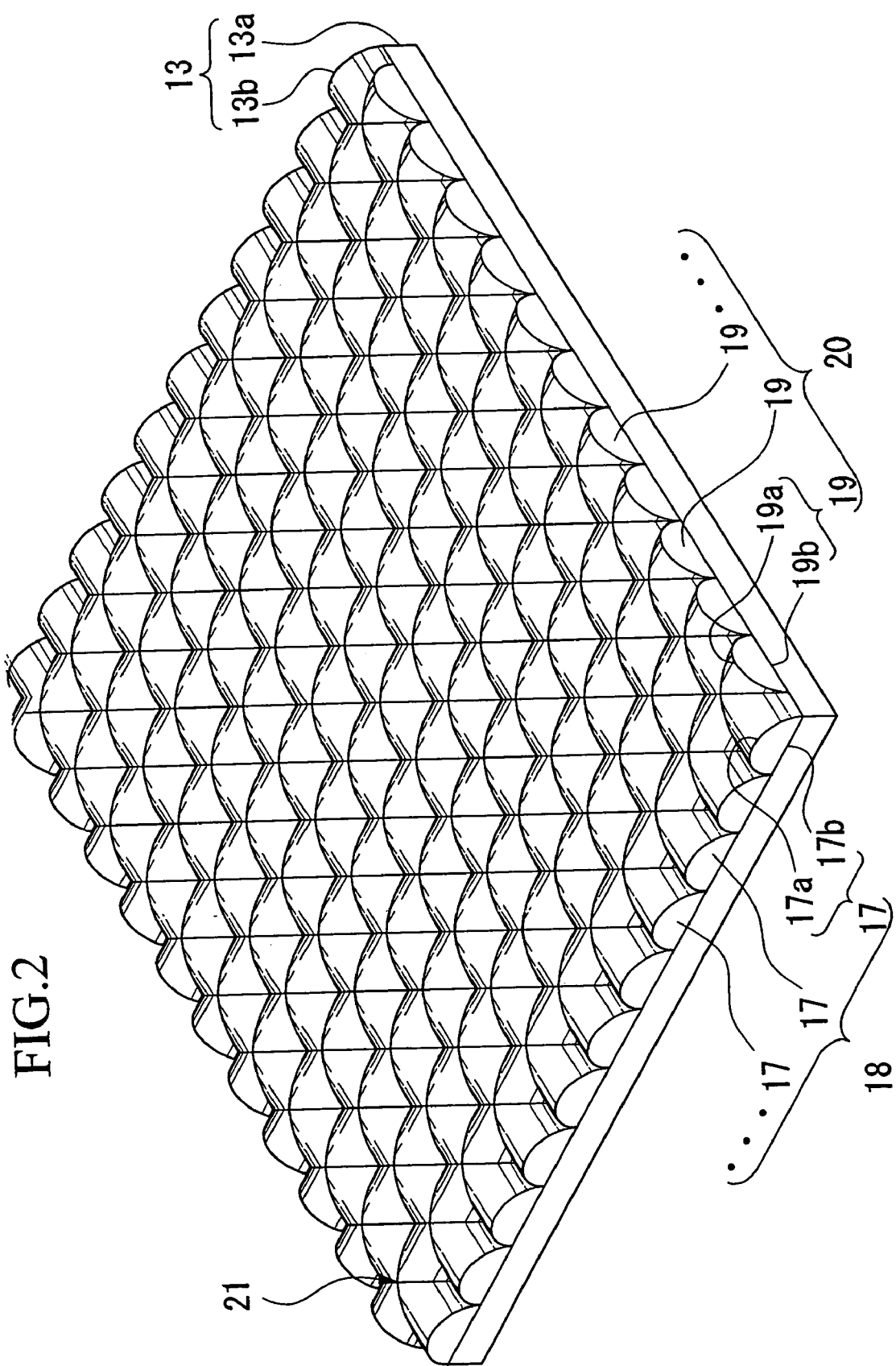
FIG. 2 is an isometric view for the lens array layer shown in FIG. 1.
Figure 3:
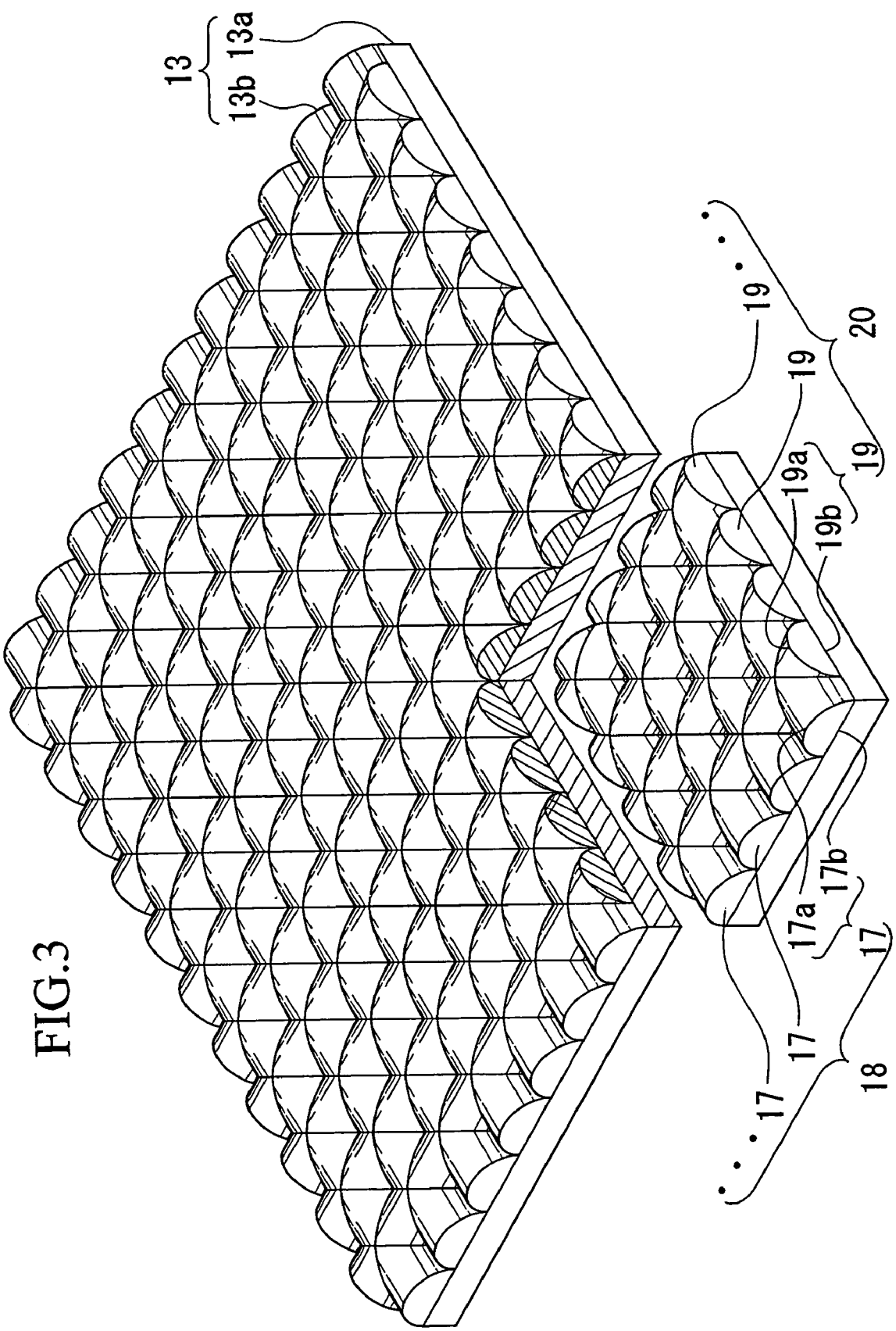
FIG. 3 is an isometric view for a cross section in which a part of the lens array layer shown in FIG. 2 is cut.

FIG. 1 is a cross section which shows a lens array layer and a shading layer which form an example for a lens array sheet according to the present invention. FIG. 2 is an isometric view for showing the lens array layer. FIG. 3 is an isometric view showing a cross section which is viewed by cutting a part of the lens array layer shown in FIG. 2. Here, the lens shapes for the lens array sheet shown in FIGS. 1 to 3 are designed. FIGS. 1 to 3 are drawn actually according to the designed shape.

A main feature for this lens array sheet is a lens array layer 13. The lens array layer 13 is formed a plate base member layer 13a and a lens layer 13b which is disposed on its surface.

The lens layer 13b is formed by a lens array 18 in which a plurality of half-cylindrical lenses 17 are disposed in parallel which are provided with a cylindrical surface 17 on a surface of a lens and a plane 17b on other surface such that the longitudinal directions, and a second lens array 20 which is formed by similarly disposing a plurality of cylindrical lenses 19 which are provided with a cylindrical surface 19a and a plane 19b such that the longitudinal directions are parallel.

Here, the cross section of the cylindrical lenses 17, 19 are not completely cylindrical (spherical lens). It is possible to use a commonly known non-half-circular shape (such as a second dimensional aspherical shape) such as a half-oval shape (oval surface lens), a parabolic shape (parabolic surface lens). Furthermore, it is possible to use a highly dimensional aspherical shape which has an item which is greater than a second dimension. It is possible to reduce an aberration for focusing an image when an aspherical lens is used; thus, it is possible to form an incident light in a fine pitch.

The planes 17b, 19b of the first lens array 18 and the second lens array 20 are disposed on a common plane (a surface of the base member layer 13a) such that the longitudinal direction of the cylindrical lens 17 which forms this and the longitudinal direction of the cylindrical lens 19 should be orthogonal so as to form a lens layer 13a. The cylindrical lens 17 and the cylindrical lens 19 are orthogonally cross crossing section 21 such that each of them engage with each other. Here, actually, the cylindrical lenses 17, 17 . . . and the cylindrical lenses 19, 19 . . . are molded unitarily; thus, the lens array layer 13 is formed by a piece of member.

For a member to form the lens array layer 13, it is possible to use any member limitlessly as long as it can be used for an optical member because it is a transparent member such as a glass member or a plastic member. It is preferable to use a plastic member if a manufacturing efficiency is taken into account. For a plastic member, it is possible to name an acrylic resin such as poly(methyl methacrylate), a polycarbonate, an copolymer of acryl-stylene, a Stylene resin, and a Poly (vinyl chloride). Also, it is preferable to use a radiation curable resin such as an ultraviolet-ray curable resin or an electronic beam curable resin for a member for forming the lens layer 13b because it is possible to form a fine pitch. For such a radiation curable resin, for example, it is possible to use a composition which is formed by doping a reaction diluting agent, a light polymerization starting agent, and an photosensitizer to a urethane(meta)acrylate and/or an epoxy (meta)acrylateoligomer. For such an urethane(meta)acrylateoligomer, it is not limited in particular. For example, it is possible to obtain by reacting polyols such as an ethyleneglycol, 1,4 butanediol, neopentylglycol, polycaprolactonepolyol, polyesterpolyol, polycarbonatediol, and poly(tetramethylene glycol) with a polyisocyanate such as hexamethylene diisocyanate, isophorone diisocyanate, toluene diisocyanate, and xylene diisocyanate. For such an epoxy (meta)acrylateoligomer, it is not limited in particular. For example, it is possible to obtain by reacting a (meta)acrylic acid with an epoxy resin such as bisphenol A epoxy resin, bisphenol A epoxy resin, phenolnovolac type epoxy resin, terminal glycidyl ether of an additional bisphenol A propylene oxide, and a fluorene epoxy resin.

It is possible to manufacture the lens array layer 13, for example, by a following manner. That is, the lens layer 13b is formed by applying a radiation curable resin under non-hardened condition on the base member layer 13a which is formed by a plastic member such a poly(ethylene terephthalate), polycarbonate, and vinyl chloride, compressing a molding stamper on a surface thereon, and emitting a predetermined radiation so as to harden.

It is possible to manufacture the molding stamper, for example, by a following manner. That is, during manufacturing a molding stamper for molding a conventional lenticular, for example, a cutting section is formed on a surface of a cylindrical cylinder of which surface is made of a copper in a circular direction of the cylinder by using a cutting bype which has a corresponding shape to a unit lens which is supposed to be manufactured. Such cutting sections are formed in a plurality of sections in parallel, it is possible to obtain a stamper for lenticular. Furthermore, if the cutting sections are formed in a plurality of sections in parallel in an orthogonal direction to the cutting section in the circular direction, it is possible to obtain a molding stamper which is used for manufacturing the lens array layer 13 of the present invention.

Therefore, it is possible to manufacture the molding stamper for manufacturing the lens array layer 13 of the present invention by using a conventional technology easily; thus, the productivity is desirable.

In this way, it is possible to manufacture the lens array layer 13 according to a method which is similar to the method which is used for manufacturing a conventional lenticular lens.

Also, as shown in FIG. 1, a photo-sensitive resin layer 15 and further a shading layer 16 are disposed on other surface (focal plane) of the base member layer 13a.

Figure 5:
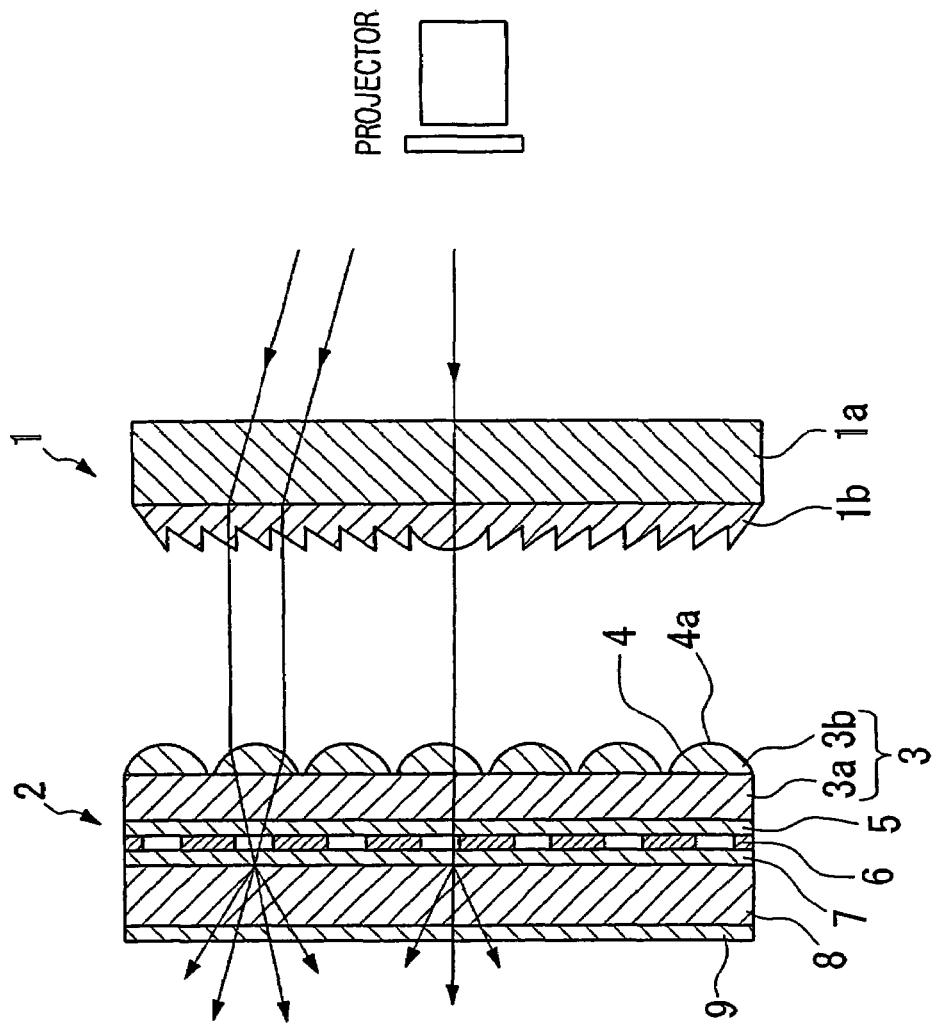
FIG. 5 is a view for a general structure of an example for a conventional transparent screen.

The photo-sensitive resin layer 15 and the shading layer 16 are manufactured in following manner. That is, as shown in FIG. 5, the photo-sensitive resin layer 15 in a section which is exposed through the lens array layer 13 is denatured by disposing the fresnel lens 1 in parallel under condition that the fresnel lens 1 should be used for a transparent screen actually and emitting a light from the lens layer 13b via the fresnel lens 1; thus, the adhesiveness disappears. In addition, a transcription film which has a black transcription layer such as a black carbon is pressed on the photo-sensitive resin layer 15, the transcription layer is transcribed on an unexposed section which has an adhesiveness; thus, a shading layer 16 is formed.

Here, the shading layer in the present invention is not limited to the above structure. In addition, following structure is preferable.

(1) a black toner in place of a transcription layer is applied in a section in which an adhesiveness of the above photosensitive resin layer 15 is maintained;

(2) a black photosensitive resin layer is formed (disposed) on an entire focal plane of the base member layer 13a, and after that the photosensitive resin layer in the section which is exposed via the lens array layer 13 is removed; and (3) a silver halide is formed on an entire surface of a focal plane of the base member layer 13a such that the above layer which is exposed through the lens array layer 13 should be transparent by a developing process.

As explained above, a structure is preferable in which an aperture section/shading layer should be limited by using a so-called self-alignment method.

In such a case, a matrix focusing pattern is formed by a first focusing pattern in a stripe manner by condensing a light by the cylindrical lenses 17, 17 . . . (first lens array 18) and a second focusing pattern in a stripe manner which is orthogonal to the first focusing pattern by condensing a light by cylindrical lenses 19, 19 . . . (second lens array 20). That is, the perspective angles of the light which is emitted from the lens layer 13b in both the vertical direction and the horizontal direction are controlled in a single operation by the first lens array 18 and the second lens array 20.

Figure 4:
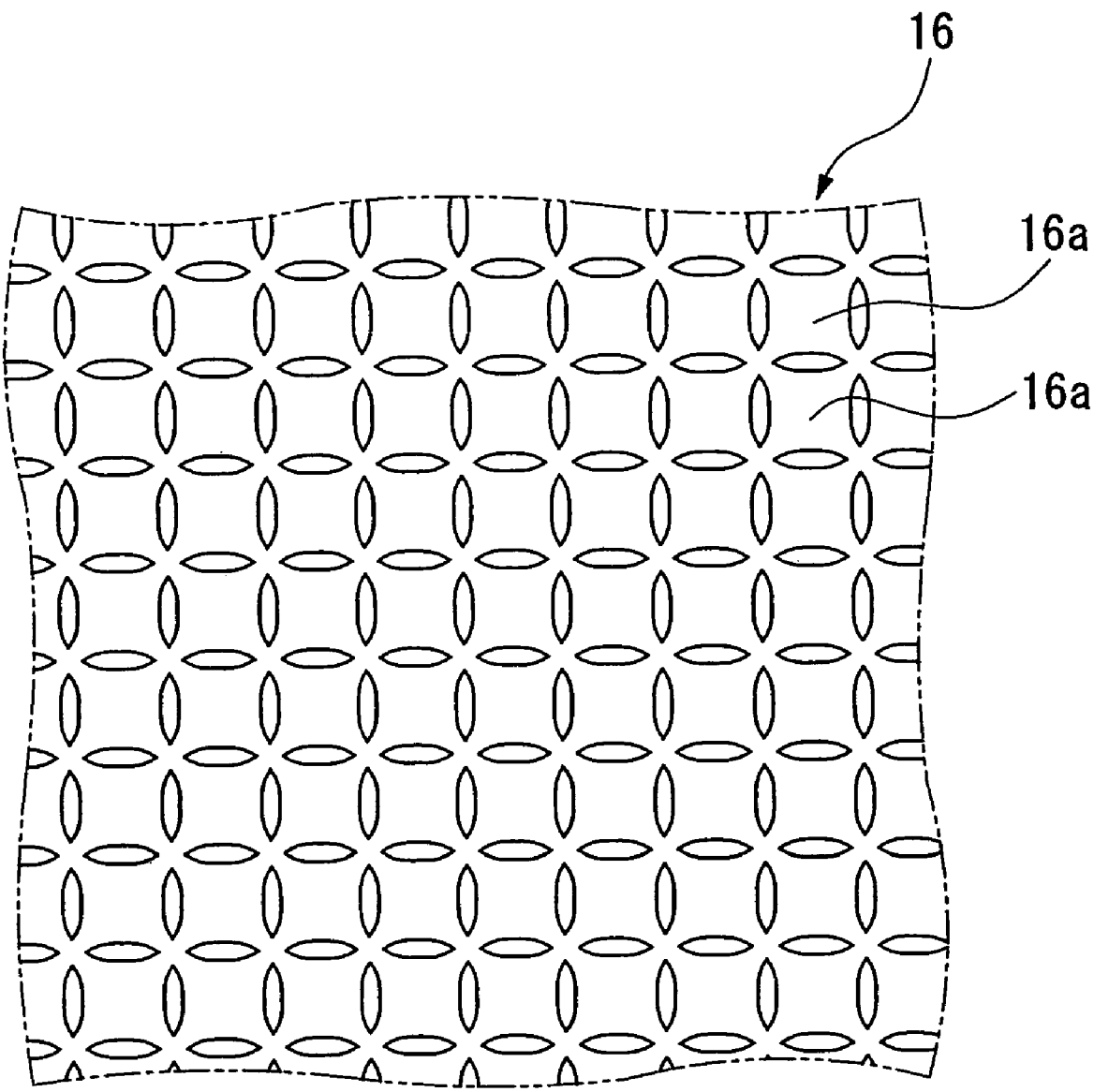
FIG. 4 is plan view for an example of a focusing pattern in the lens array shown in FIGS. 1 to 3.

FIG. 4 shows an example for such a focusing pattern.

The shading layer 16 is formed so as to block a light which transmits through the lens array layer 13 via the fresnel lens 1 in a section in which the light should not transmit therethrough. Therefore, a plurality of approximate square shading sections 16a . . . are disposed in both the vertical direction and the horizontal direction in a predetermined interval respectively according to such a focusing pattern.

In addition, it is possible to form a lens array sheet by disposing an adhesive layer 7, a dispersing layer 8, and a hard coat layer 9 etc. according to necessity as shown in FIG. 5.

In this way, it is possible to control the optical distribution characteristics (perspective angle) of the light in both the vertical direction and the horizontal direction which transmits the lens array layer 13 by the first lens array 18 and the second lens array 20 in this lens array sheet.

Therefore, it is possible to restrict a material cost and a manufacturing cost with compared to a case in which two layers such as lens array layers are used, or the lens layers are formed on both surfaces of the base member layer.

Also, it is possible to avoid the optical absorption by the dispersing layer 8 and the reduction of the gain by omitting or simplifying the dispersing layer 8. As a result, it is possible to restrict a white dispersion phenomenon which is caused by the dispersing layer 8 so as to realize a high S/N ratio.

Here, if the dispersing layer 8 is not formed, it is preferable to form a lens array sheet by disposing a hard coat layer 9 on the shading layer 6.

Here, it is possible to modify a thickness of each layer in the lens array sheet and a pitch of the lens layer 3b according to the usage appropriately without being limited.

In addition, as shown in FIG. 5, it is possible to form the transparent screen by disposing the lens array sheet of the present invention in place of the lenticular sheet 2 and the fresnel lens 1.

Here, it is possible to use a commonly known member while the structure of the fresnel lens 1 is not limited in particular. It is preferable to form the lens layer 1b by applying a Radiation curable resin under a non-hardened condition on the base member layer 1a which is formed by a plastic member such as a poly(ethylene terephthalate), polycarbonate, poly (vinyl chloride) and compressing the molding stamper from thereon because it is possible to perform a fine molding operation so as to obtain fine-pitch product.

First Embodiment

Hereinafter, a first example of the present invention is shown so as to clarify an effect of the present invention.

As explained above, the lens shapes for the lens array sheet shown in FIGS. 1 to 3 are designed. FIGS. 1 to 3 are drawn actually according to the designed shape.

In the present example, design parameters are determined as follows; thus, an experiment for proving the effect is performed.

Design Parameters
(1) In the base member layer for the lens array layer, a material member is a Polyethylene terephthalate, and a thickness is 0.188 mm.
(2) In the lens layer for the lens array layer, a material member is an UV photosensitive resin. The lens is formed in an aspherical shape which is formed by adding a higher dimension with reference to a surface an oval surface which has 182 μm pitch.
(3) Cromarin (a registered trademark for a product of DUPON) film having 20 μm thickness is used for a photosensitive resin layer.

That is, a test piece which has 30 mm×30 mm size is produced according to such a design and an optical distribution characteristics is examined. As a result, approximately 30 degrees of perspective angle (half angle) is realized both in an up-down direction (vertical direction) and a left-right direction (horizontal direction). Thus, it is possible to realize a predetermined optical characteristics. Here, the perspective angle (half angle) indicates an angle which is a half of brightness in a front end of the lens array sheet.

Furthermore, it is observed that a focusing pattern in this lens array layer is similar to a focusing pattern which is shown in FIG. 4. In addition, when a light is emitted from a projector to a lens array sheet on which a shading layer is disposed so as to correspond to such a focusing pattern, there is no problem in transmitting the light therethrough.

In this way, it is possible to add perspective angles both in a horizontal direction and a vertical direction in the lens array sheet according to the present example. Here, the perspective angle is added in a conventional lenticular sheet only in a horizontal direction of the lens as explained above. Thus, it is not possible to add the perspective angle in a vertical direction. Therefore, in the present example, it is confirmed that it is possible to realize a similar effect to a conventional case easily even if a dispersing member is omitted or reduced than in a conventional case. Therefore, it is confirmed that it is possible to realize a high quality image and a lower cost compatibly easily by the present invention.

Second Embodiment

Hereinafter, a detail of the second embodiment of the present invention is explained with reference to drawings as follows.

Figure 6:
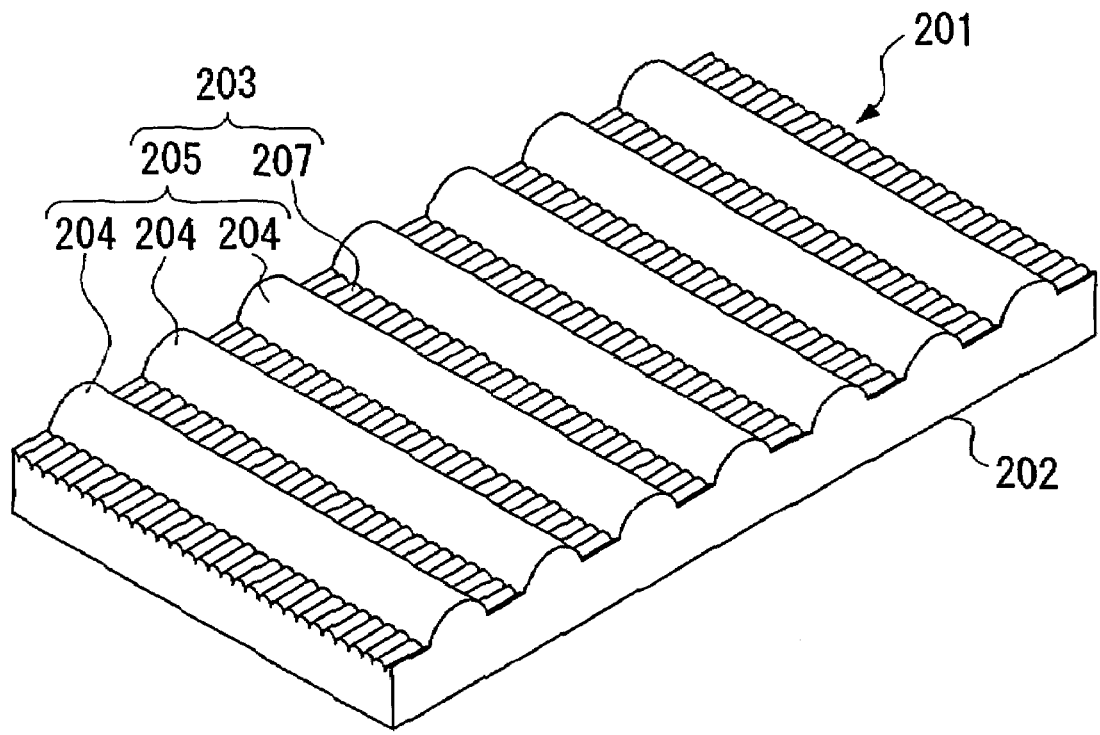
FIG. 6 is an isometric view for an embodiment of a lens array sheet according to the present invention.
Figure 7:
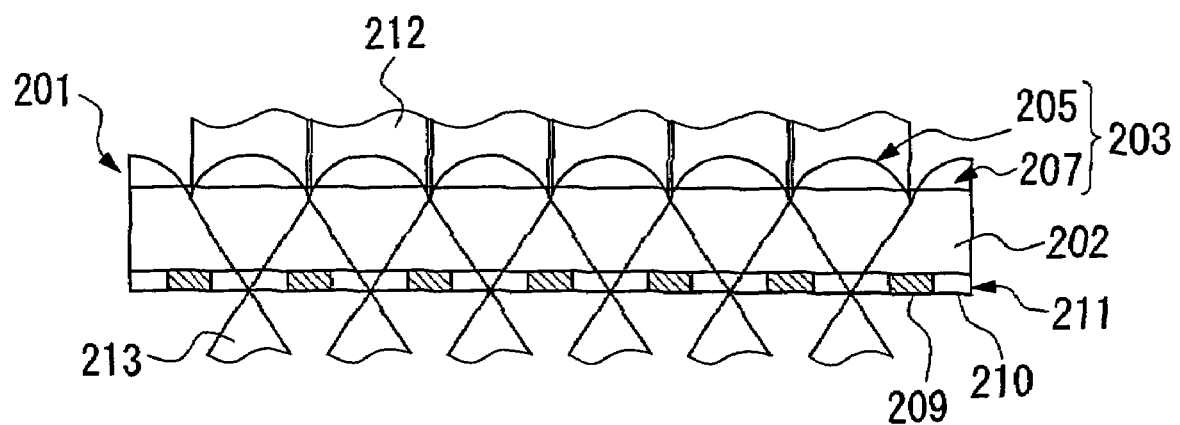
FIG. 7 is a general view for a cross section for the lens array sheet.
Figure 8:
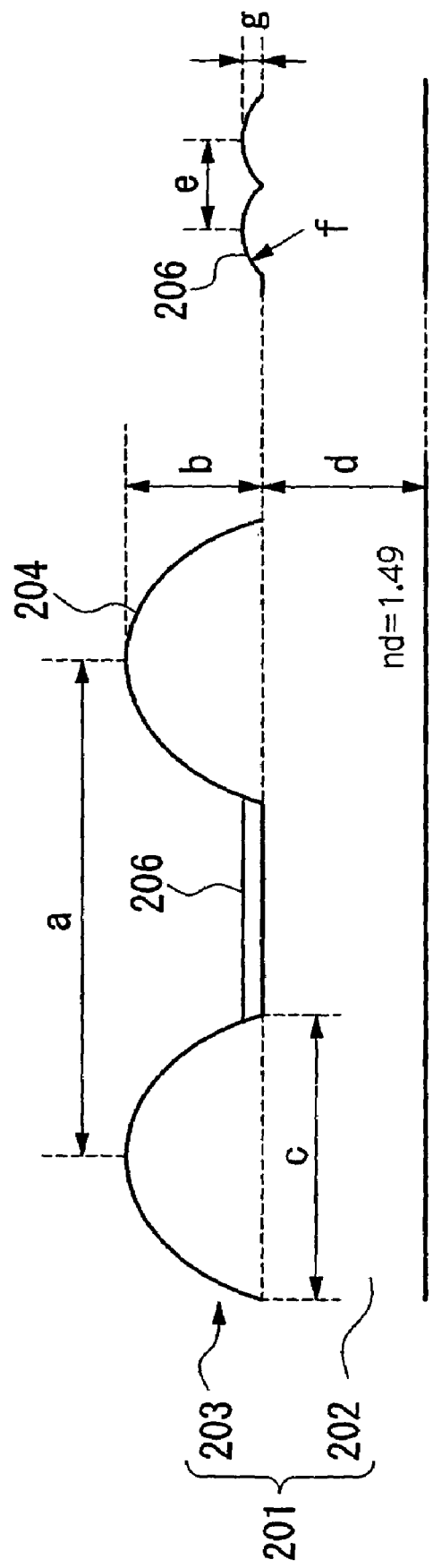
FIG. 8 is an enlarged general view for a cross section for the lens array sheet.

FIGS. 6 and 7 show an example or the lens array sheet according to the present invention. FIG. 6 is an isometric view for the lens array sheet. FIG. 7 is a cross section. FIG. 8 is a cross section for an important part of a prototype lens array sheet which is produced in an embodiment of the present invention which is explained later in an enlarged manner.

This lens array sheet 201 is formed by a base member layer 202 which is formed by a transparent material member, and a lens array layer 203 which is disposed on a surface of the base material layer 202. A feature of the present invention resides in a structure of the lens array layer 203.

In a structure of the above lens array layer 203, a first lens array 205 which is formed by disposing a plurality of cylindrical lenses 204 without intervals therebetween in parallel and a second lens array 207 which is formed by disposing a plurality of cylindrical lenses 206 in a direction which is crossing, preferably orthogonal, to a longitudinal direction of the first lens array 205 are disposed on a common surface of the base member layer 202.

A shading layer 211 is disposed on a surface which is opposite to the base member layer 2 on which the lens array layer 203 is formed which is a focal plane of the lens array. The shading layer 211 is formed by a plurality of shading aperture sections 210 for through which transmitting the emitted light 213 when an incident light 212 transmits the lens array layer 203 so as to be emitted from the focal plane and a shading material member such as a shading layer shading section 209 which is formed, for example, by a carbon black film which is disposed around the shading layer aperture sections 210.

The cross sectional shape for the two cylindrical lenses 204, 206 which form the first lens array 205 and the second lens array 207 is not limited to spherical shape. It is possible to use a so called aspherical shape such as an oval surface, a parabolic surface (see cylindrical lens 4 shown in FIG. 3). It is possible to reduce an aberration for focusing an image when an aspherical lens is used; thus, it is possible to form an incident light in a fine pitch.

For a member to form the lens array layer 203, it is possible to use any member limitlessly as long as it can be used for an optical member because it is a transparent member such as a glass member or a plastic member. It is preferable to use a plastic member if a manufacturing efficiency is taken into account.

For a plastic member, it is possible to name an acrylic resin such as poly(methyl methacrylate), a polycarbonate, an copolymer of acryl-stylene, a Stylene resin, and a Poly (vinyl chloride).

Also, it is preferable to use a radiation curable resin such as an ultraviolet-ray curable resin or an electronic beam curable resin for a member for forming the lens array layer 203b because it is possible to form a fine pitch.

For such a radiation curable resin, for example, it is possible to use a composition which is formed by doping a reaction diluting agent, a light polymerization starting agent, and an photosensitizer to a urethane(meta)acrylate and/or an epoxy(meta)acrylateoligomer. For such an urethane(meta) oligomer, it is not limited in particular. For example, it is possible to obtain by reacting polyols such as an ethyleneglycol, 1,4 butanediol, neopentylglycol, polycaprolactonepolyol, polyesterpolyol, polycarbonatediol, and poly(tetramethylene glycol) with a polyisocyanate such as hexamethylene diisocyanate, isophorone diisocyanate, toluene diisocyanate, and xylene diisocyanate. For such an epoxy (meta)acrylateoligomer, it is not limited in particular. For example, it is possible to obtain by reacting a (meta)acrylic acid with an epoxy resin such as bisphenol A epoxy resin, bisphenol A epoxy resin, phenolnovolac type epoxy resin, terminal glycidyl ether of an additional bisphenol A propylene oxide, and a fluorene epoxy resin.

It is possible to manufacture the lens array layer 203, for example, by a following manner. A radiation curable resin is applied on the base member layer 202 which is formed by a plastic member under unhardened condition. A molding stamper is compressed on the surface so as to perform a mold pressing operation. Simultaneously, a predetermined radiation is emitted so as to harden it; thus, a lens array layer 203 is molded.

The above explained molding stamper can form a lens layer, for example, in a following way. That is, during manufacturing a molding stamper for molding a conventional lenticular, for example, a cutting section is formed on a surface of a cylindrical cylinder of which surface is made of a copper in a circular direction of the cylinder by using a cutting byte which has a round edge shape. Such cutting sections are formed in a plurality of sections in parallel, it is possible to obtain a stamper for lenticular. Furthermore, a plurality of cutting sections are formed in a crossing direction, preferably in an orthogonal direction, to the cutting section in this circular direction, it is possible to obtain a molding stamper which can be used for manufacturing the lens array layer 3 which is a characteristic part of the present invention.

Therefore, it is possible to manufacture the molding stamper for manufacturing the lens array layer 203 which is a characteristic part of the present invention by using a conventional technology easily; thus, the productivity is desirable. In this way, it is possible to manufacture the lens array layer 1 according to a method which is similar to the method which is used for manufacturing a conventional lenticular lens sheet.

It is possible to manufacture a photo-sensitive resin layer which forms the lens array layer 203 and the shading layer 211 in a following way. If the fresnel lenses are disposed in parallel actually under a similar condition in which they are used for the transparent screen and a light is emitted from the lens layer of the lens array sheet via the fresnel lens, the photo-sensitive resin layer in a part which is exposed by alilght which transmits the lens array layer 203 is denatured; thus, an adhesiveness disappears. In addition, a transcription film which has a black transcription layer such as a black carbon is pressed on the photo-sensitive resin layer, the transcription layer is transcribed on an unexposed section which has an adhesiveness; thus, a shading layer 211 is formed.

In such a case, a focusing pattern in a ladder manner is formed by a stripe first focusing pattern which is formed by condensing a light by the cylindrical lens and a stripe second focusing pattern which is orthogonal to the first focusing pattern. That is, the perspective angles of the light which is emitted from the lens layer in both the vertical direction and the horizontal direction are controlled in a single operation by the first lens array and the second lens array.

The shading layer 11 is disposed so as to block a light in a section through which the light does not transmit. Therefore, a plurality of shading sections are disposed according to such a focusing pattern regularly both in a vertical direction and a horizontal direction respectively.

In addition, it is possible to form a lens array sheet by disposing an adhesive agent layer, a dispersing layer, and a hard coat layer etc. on the shading layer according to necessity.

In this way, it is possible to control the optical distribution characteristics (perspective angle) of the light in both the vertical direction and the horizontal direction which transmits the lens array layer 203 by the first lens array 205 and the second lens array 207 in this lens array sheet 201.

Therefore, it is possible to restrict a material cost and a manufacturing cost with compared to a case in which two layers such as lens array layers are used, or the lens layers are formed on both surfaces of the base member layer.

Also, it is possible to avoid the optical absorption by the dispersing layer and the reduction of the gain by omitting or simplifying the dispersing layer 8. As a result, it is possible to control a white dispersion phenomenon which is caused by the dispersing layer 8 so as to realize a high S/N ratio.

Here, it is possible to modify a thickness of each layer in the lens array sheet 201 and a pitch of the lens array layer 203 according to the usage appropriately without being limited.

Figure 9:
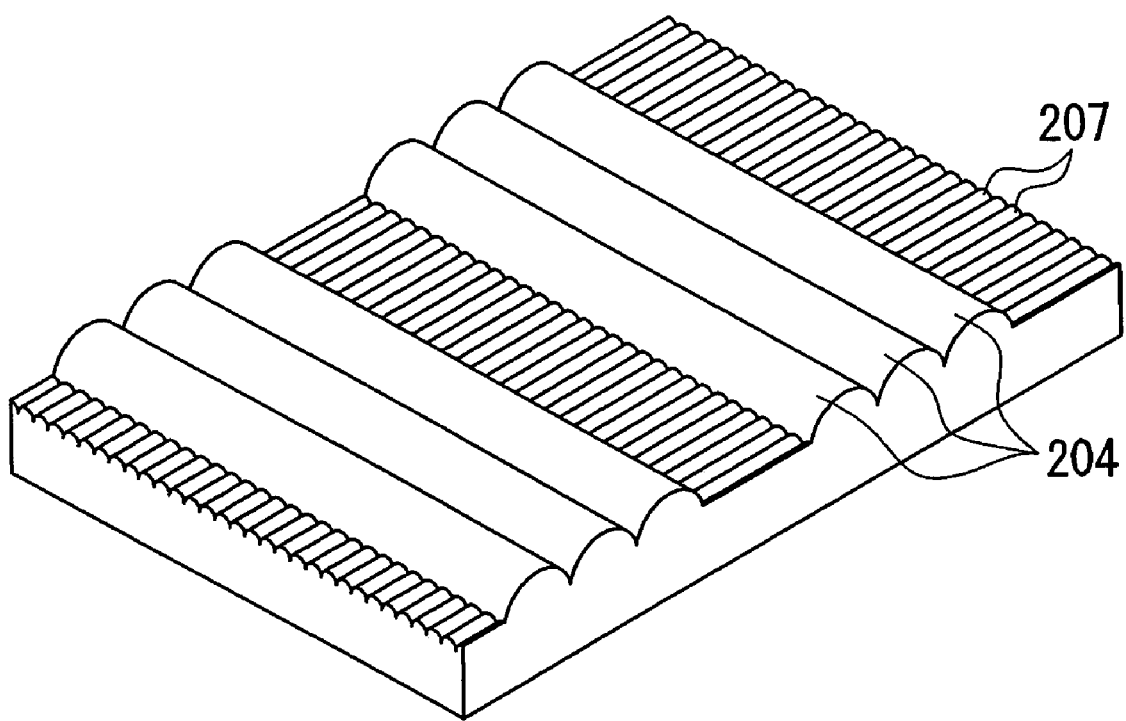
FIG. 9 is an isometric view for another embodiment of a lens array sheet according to the present invention.
Figure 10:
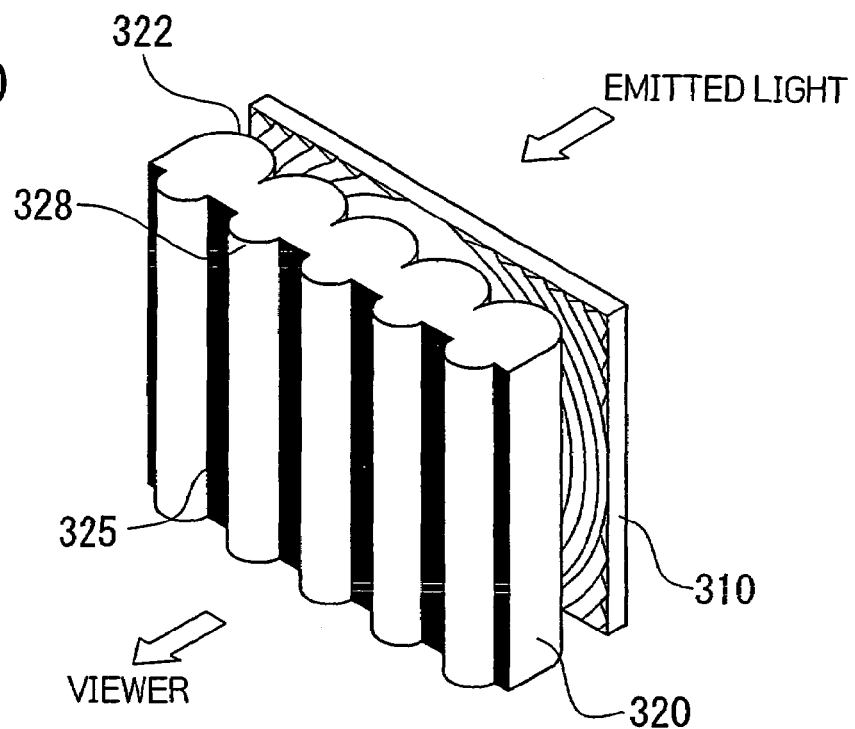
FIG. 10 is a view for explaining an example for a conventional projection screen.
Figure 11:
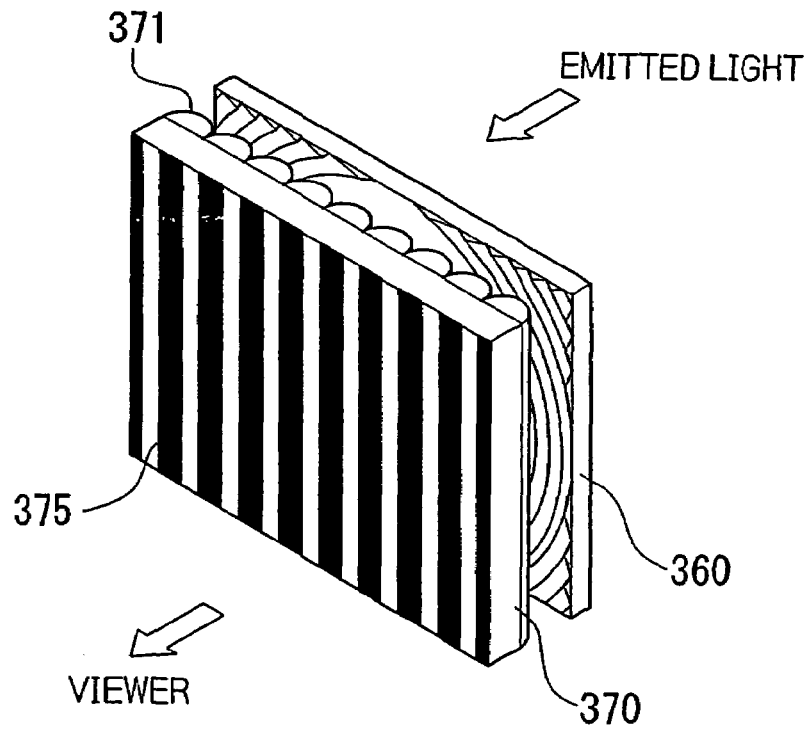
FIG. 11 is a view for explaining an example for a conventional projection screen.

FIG. 9 is a view for another embodiment of a lens array sheet according to the present invention. Also, the lens array sheet of the present invention is provided in which a first cylindrical lens which is formed by disposing a plurality of half-cylindrical lenses 204 in parallel and a second lens array which is formed by disposing a plurality of half-cylindrical lenses 207 in parallel are disposed on a same plane so as to be orthogonally approximately in longitudinal directions of the cylindrical lens in a lens array layer which has a unified lens layer, a peak of unit lens in the first lens array is continuous over the longitudinal direction, the second lens array is disposed by forming the unit lenses the peak of which is not continuous over a longitudinal direction between the peaks of the neighboring unit lenses in the first lens array. It is possible to realize an effect of the lens array sheet which is similar to the lens array sheet in the above explained first embodiment.

Hereinafter, an effect of the present invention is explained with reference to a second example.

In the present example, design parameters a to g for the lens array sheets 201 which is shown in FIG. 8 are determined as follows and experiments are performed so as to prove the effects.

Design Parameters

For the base member layer for the lens array layer 203, the material member is a Polyethylene terephthalate. Its thickness d is 0.125 mm.

The material member for the cylindrical lens 4 for the lens array layer 203 is a photo-sensitive resin layer. Interval a for the lenses is 0.252 mm. A protruding height b is 0.08 mm. Width c for the lens is 0.168 mm. A surface shape is an aspherical to which a high dimension is added with reference to an oval surface. The cylindrical lens 6 in the second lens array is formed such that an interval e between the lenses is 0.04079 mm, a protruding height is 0.008 mm, a curvature f is 0.03 mm so as to be a hemispherical shape.

For the photo-sensitive resin layer, a Cromarin film which is a positive photo-sensitive resin adhesive layer of which adhesiveness disappears by being exposed to a light (a product of DUPON; trademark is registered) is used which has 20 μm thickness.

It is possible to obtain a shading layer 211 which has an aperture which corresponds to a cylindrical lens which forms the lens array by performing a patterning operation for the photosensitive layer by emitting a parallel light which is collimated in 1° to 5° against a surface for forming a lens of the lens array sheet 201 and transcribing a black film (a transcription film of a carbon black) which has 2 μm thickness.

It is observed that it is possible to obtain a perspective angle so as to correspond to the second lens array 207 by using the lens array sheet 201 which is obtained in this way and using the first lens array 205 for dispersing a light in a horizontal direction.

Third Embodiment

Furthermore, a third embodiment of the present invention is explained with reference to drawings.

Figure 12:
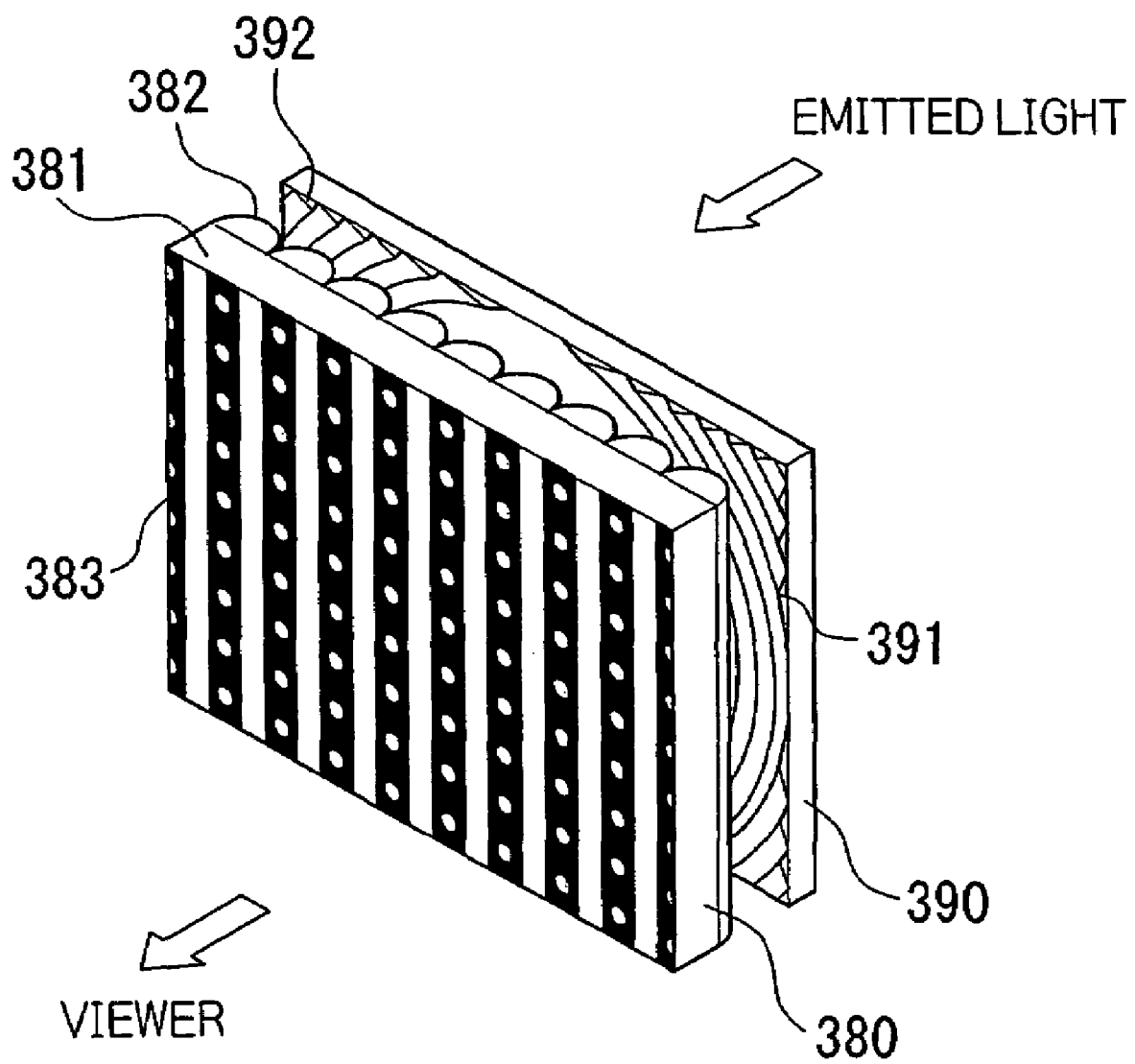
FIG. 12 is a view for explaining an example for a projection screen according to the present invention.

FIG. 12 is a view for explaining an example for a structure of a transparent projection screen which relates to a lens array sheet according to an example of the present invention.

In a structure for the projection screen which is shown in the above drawing, a fresnel lens sheet 390 in which a lens section 392 is disposed on a surface of a base board 391 near a light emitting section and a lens array sheet 380 in which an orthogonal lens section 382 is disposed on a surface (near light emitting section) of a light dispersing base board 382 which is formed by dispersing an optical dispersing agent (particle) is disposed such that mutual lens sections 392, 382 should face each other.

For such a transparent resin which is used for the base boards 392, 381, it is possible to use, for example, acrylic resin, polycarbonate resin, polyester resin, polyethylene resin, polyolefin resin, vinyl chloride resin, polyimide resin, a blended product of the above resins, or a sheet or a film which is formed by copolymer.

For a member to form the lens sections 392, 382, it is possible to use any member limitlessly as long as it can be used for an optical member because it is a transparent member such as a glass member or a plastic member. It is preferable to use a plastic member if a manufacturing efficiency is taken into account.

For a plastic member, it is possible to name an acrylic resin such as polymethyl methacrylate, a polycarbonate, an copolymer of acryl-stylene, a Stylene resin, and a Polyvinyl chloride.

Also, it is preferable to use a radiation curable resin such as an ultraviolet-ray curable resin or an electronic beam curable resin for a member for forming the lens sections 392, 382 because it is possible to form a fine pitch.

For such a radiation curable resin, for example, it is possible to use a composition which is formed by doping a reaction diluting agent, a light polymerization starting agent, and an photosensitizer to a urethane(meta)acrylate and/or an epoxy(meta)acrylateoligomer.

For such an urethane(meta)acrylateoligomer, it is not limited in particular. For example, it is possible to obtain by reacting polyols such as an ethyleneglycol, 1,4 butanediol, neopentylglycol, polycaprolactonepolyol, polyesterpolyol, polycarbonatediol, and poly(tetramethylene glycol) with a polyisocyanate such as hexamethylene diisocyanate, isophorone diisocyanate, toluene diisocyanate, and xylene diisocyanate.

For such an epoxy(meta)acrylateoligomer, it is not limited in particular. For example, it is possible to obtain by reacting a (meta)acrylic acid with an epoxy resin such as bisphenol A epoxy resin, bisphenol A epoxy resin, phenolnovolac type epoxy resin, terminal glycidyl ether of an additional bisphenol A propylene oxide, and a fluorene epoxy resin.

It is possible to manufacture the orthogonal lens section 382, for example, by a following manner.

A radiation curable resin is applied on the optical dispersing base board 381 which is formed mainly by the above transparent resin under unhardened condition. A molding stamper is compressed on the surface so as to perform a mold pressing operation. Simultaneously, a predetermined radiation is emitted so as to harden it; thus, a lens section 382 is molded.

It is possible to manufacture the lens array layer, for example, by a following manner.

That is, during manufacturing a molding stamper for molding a conventional lenticular, for example, a cutting section is formed on a surface of a cylindrical cylinder of which surface is made of a copper in a circular direction of the cylinder by using a cutting byte which has a round edge shape. Such cutting sections are formed in a plurality of sections in parallel, it is possible to obtain a stamper for lenticular. Furthermore, if the cutting sections are formed in a plurality of sections in parallel in an orthogonal direction to the cutting section in the circular direction, it is possible to obtain a molding stamper which is used for manufacturing the lens array layer 313 of the present invention.

Therefore, it is possible to manufacture the molding stamper for manufacturing the lens section 382 of the present invention by using a pre-installed technology easily; thus, the productivity is desirable.

In this way, it is possible to manufacture the lens section 382 according to a method which is similar to the method which is used for manufacturing a conventional lenticular.

Two lens array sheets were conventionally used by forming the lenticular sheets for a horizontal direction and a vertical direction so as to use the above explained orthogonal lens section 382. In the present invention, the first lens array and the second lens array which are formed by disposing a plurality of half columnar cylindrical lenses in parallel are disposed on a common surface such that the longitudinal directions of the cylindrical lenses should be approximately orthogonal. The lens array sheet is provided with a lens array layer which has a unified lens layer. Therefore, the perspective angles in the horizontal direction and the vertical direction are enlarged by a piece of the lens array sheet.

It is possible to modify the optical characteristics such as a horizontal perspective angle and the vertical perspective angle separately. In a common usage condition, a light distribution characteristics in the lens for the horizontal perspective angle (dispersing characteristics which is indicated by a half angle etc.) is designed to be large.

The light distribution characteristics is controlled by factors such as a curvature of an arc in a cross section of the unit lens and a cutting depth into the unit lens.

An example for a structure in the orthogonal lens section 382 is shown in FIG. 13.

Figure 13A:
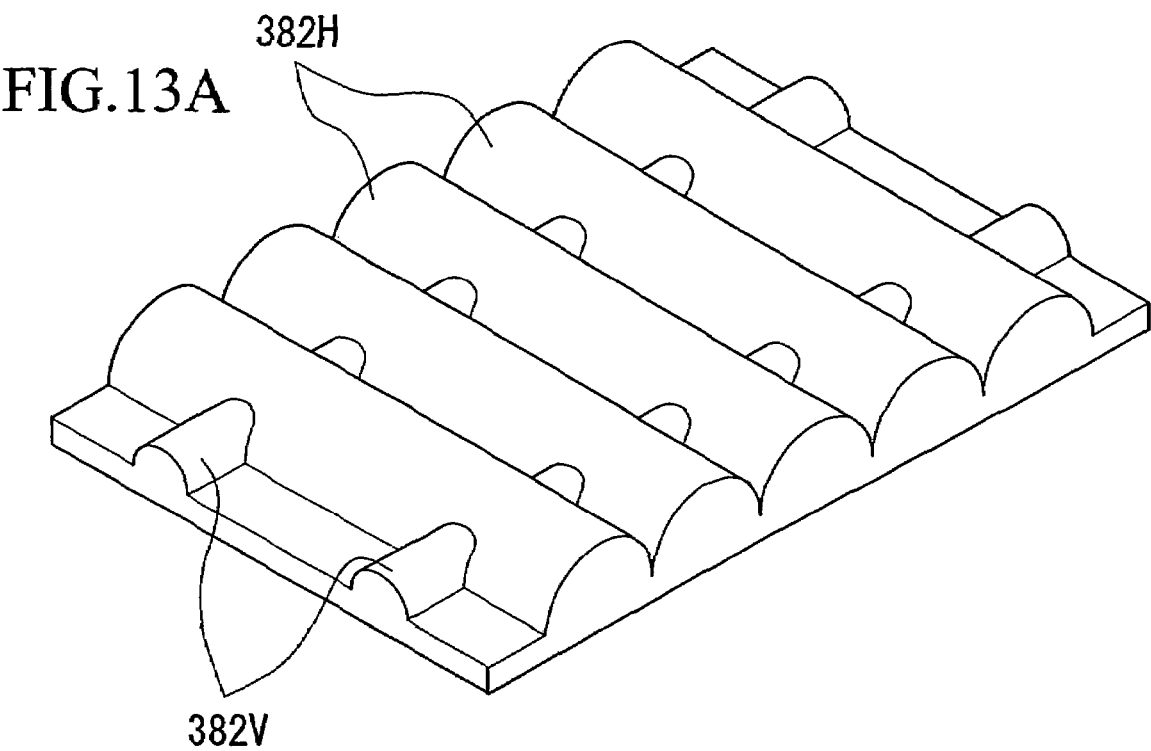
FIGS. 13A and 13B are views for explaining examples for a structure of an orthogonal lens section.

FIG. 13A is a plan view for showing an example for an orthogonal lens section 382.

A unit lens (horizontal perspective angle enlarging lens) 382H which forms a first lens array which enlarges the perspective angle in the horizontal direction has a cylindrical lens shape such that a peak section of the unit lens is continuous in a longitudinal direction.

The unit lens (vertical perspective angle enlarging lens) 382V which forms a second lens array for enlarging the perspective angle in the vertical direction is formed such that the peak section of the unit lens is not continuous over the longitudinal direction (horizontal direction).

In an example in FIG. 13A, in the first lens array, the unit lenses 382H are disposed in parallel without intervals therebetween. In the second lens array, the unit lenses 382V are disposed so as to be separated from each other. The present invention is not limited to such structures.

Figure 13B:
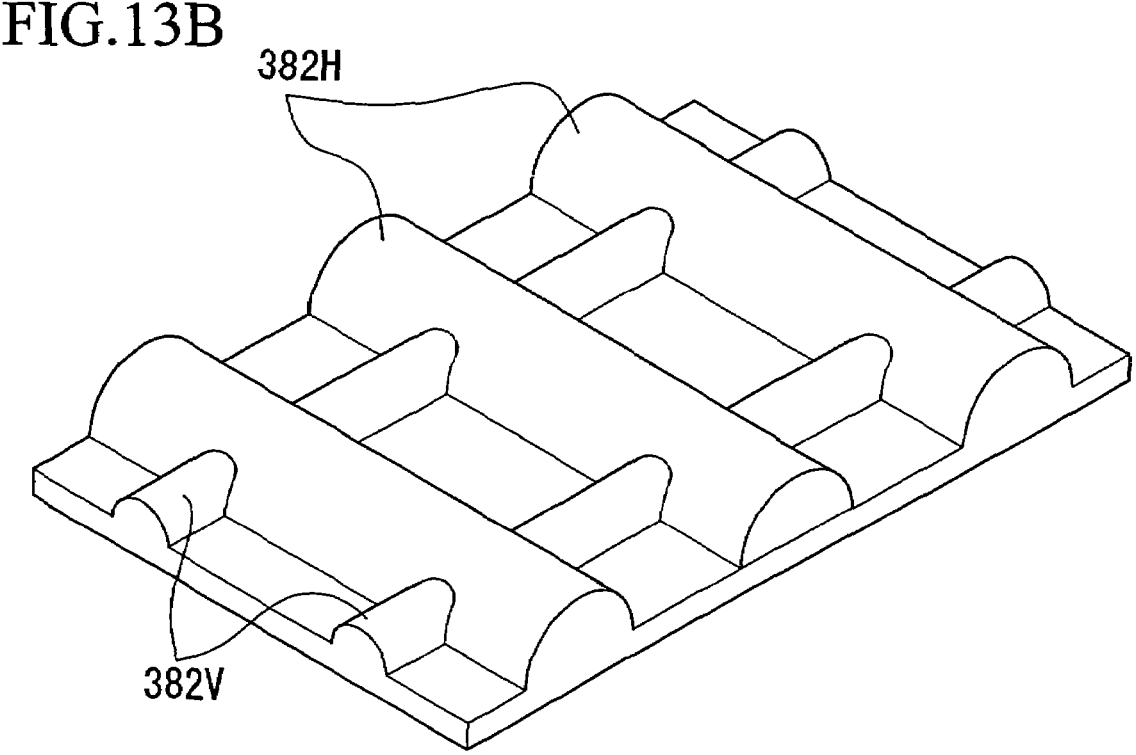

FIG. 13B is a plan view for showing other example for an orthogonal lens section 382.

FIG. 13B shows a structure in which the unit lenses are disposed in parallel so as to be separated from each other together with the first lens array and the second lens array.

Both the unit lenses 382H, 382V are disposed so as to have a plane section between the unit lenses. As shown in the drawing, the unit lens 382V is disposed in a concave section (where the width of the unit lens is narrow) such that a border line which defines a valley section of the unit lens 82H is non-linear and continuous.

As shown in both FIGS. 13A and 13B, the height of the unit lens 382H is higher than the height of the unit lens 382V (in the molding stamper which has a corresponding opposite shape, a valley section is disposed deeper). Thus, the peak section of the unit lens 382H is continuous linearly over the longitudinal direction of the cylindrical lens.

The original shape for the cylindrical lens is less deformed in a structure shown in FIG. 13B in which a plane section is provided between the unit lenses and other unit lenses are disposed in a plane section. Therefore, it is possible to anticipate that the optical characteristics which correspond to the first lens array and the second lens array are maintained independently.

Also, there are fewer cutting steps in a manufacturing operation in a structure shown in FIG. 13B; therefore, it is possible to manufacture more easily than in a structure shown in FIG. 13A.

In the present invention, following modifications are included other than the structures shown in FIGS. 13A and 13B.

In the first lens array, the unit lenses 382H are disposed separately via the plane section. In the second lens array, the unit lenses 382V are disposed without intervals.

The unit lenses are disposed in parallel without intervals both in the first lens array and the second lens array.

Figure 14:
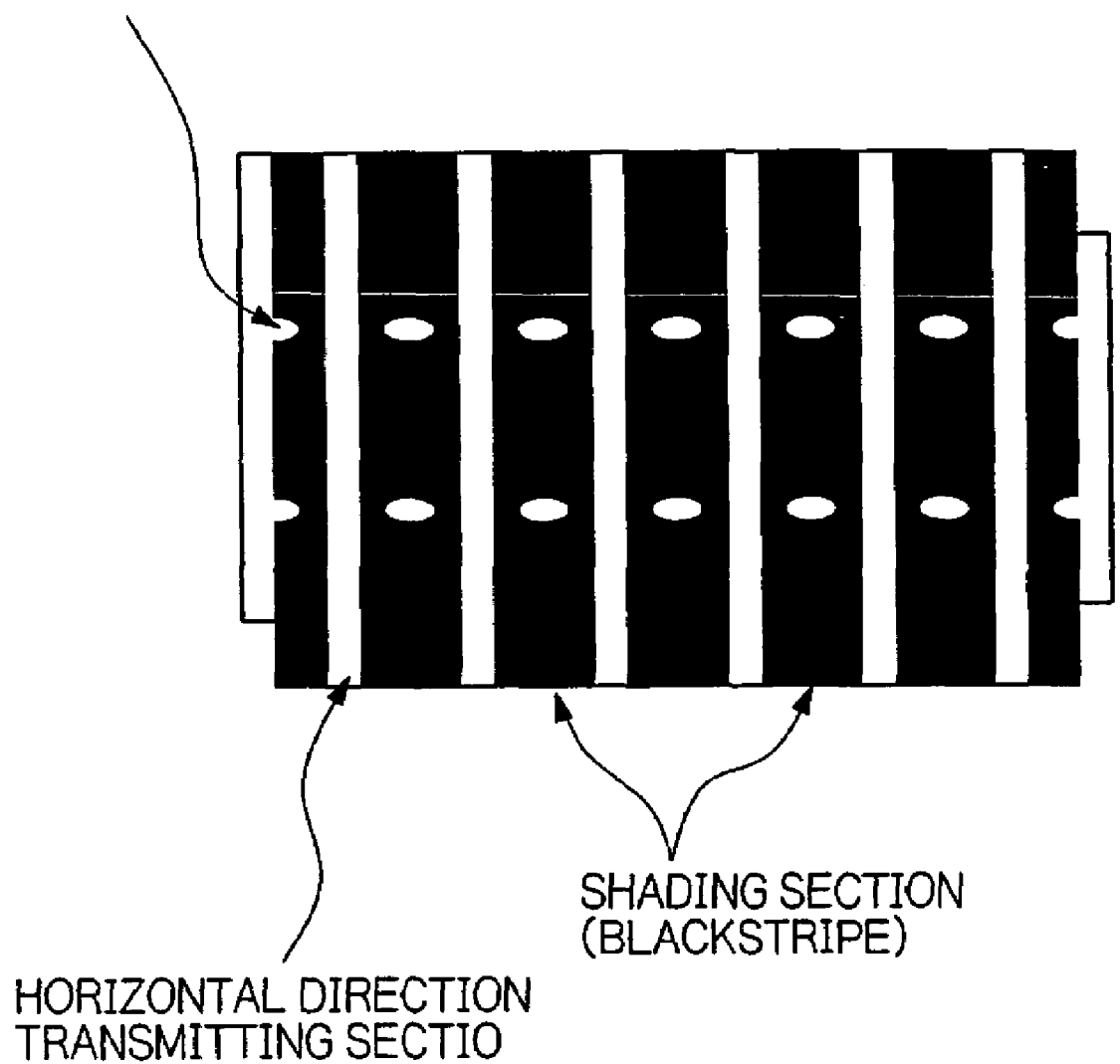
FIG. 14 is a view for explaining an example for a structure of the shading layer.

If a shading layer is formed in a section which corresponds to a non-light condensing section according to the light condensing characteristics by the lens array on a plane surface near an opposite lens array in the lens array sheet shown in FIGS. 13A and 13B, such a condition indicates a structure shown in FIG. 14.

That is, a section which corresponds to a peak section of the lens array is a light condensing section so as to be a light transmitting section (aperture). Therefore, according to a fact that a peak section of the unit lens (horizontal perspective angle enlarging lens) which forms the first lens array is continuous in a longitudinal direction, in a stripe aperture (in the drawing, it is described for a horizontal direction transmitting section) and the unit lens (vertical perspective angle enlarging lens) 382V which forms the second lens array, according to a fact that the peak section of the unit lenses is formed in a non-continuous manner over a length direction (horizontal direction), an approximate spot aperture (it is described as a horizontal direction transmitting section in the drawing. Each spot is in a stripe manner which corresponds to a light condensing section in the cylindrical lens) is formed; thus, a shading pattern which is shown in the drawing is formed.

A ratio which is occupied by the shading layer is preferably in a range of 30 to 90% for observing a displayed image in a high contrast so as to be controlled by a light condensing characteristics of the lens array (a focusing condition in a plane surface which is opposite to the lens array) and a disposition of the unit lenses.

Here, for a case for a lens sheet which has a lens section in a fine pitch (high resolution), it is preferable to employ a method such as a self-alignment method in which a position which corresponds to a non-light-condensing section in each lens section is determined accurately by using a light-condensing-characteristics of the lens section itself against a photosensitive resin layer which is formed on a surface which is opposite to the lens on the lens sheet for forming the shading layer.

In order to form a shading layer which has a preferable shading ratio for the transparent projection screen (it is empirically understood commonly that a range such as 60% or greater is desirable for a contrast of the image), a position for condensing (focusing) a light by the lens section is set preferably inside the photosensitive resin layer according to the shading ratio for the pattern to be formed.

For such a self-alignment method, it is possible to name a wet method in which a shading pattern is formed after performing a developing process operation for the exposed photosensitive resin layer and a dry method in which the exposed photosensitive resin layer is colored without performing a developing processing operation so as to form the shading pattern.

In the dry method, a photosensitive adhesive agent is used which has a characteristics which becomes adhesive according to whether or not it is exposed to a light; thus, it is colored according to whether or not it is adhesive.

Third Example

FIG. 15 is a table for comparing optical characteristics in samples which are prototypes produced by various designs for a screen (examples 3-1 to 3-3) in which a lens array sheet of the present invention is used and a screen (comparative examples 1 and 2) in which a lenticular sheet is used in which conventional cylindrical lens groups are disposed in parallel in a direction (horizontal direction).

In the screen of the comparative example 1, a fresnel lens sheet (which does not have an optical dispersing layer which is formed by optical dispersing agent for a base member, and haze is 0%) and a lenticular sheet (which is an H lens in which cylindrical lens groups are disposed in parallel in a horizontal direction such that an optical dispersing layer is provided on the base member, and haze is 80%) are disposed from a projector to therefarther.

In the screen of the comparative example 2, a fresnel lens sheet (which has an optical dispersing layer which is formed by optical dispersing agent for a base member, and haze is 60%) and a lenticular sheet (which is an H lens in which the base member has an optical dispersing layer, and haze is 80%) are disposed from a projector to therefarther.

In the screen of the example 3-1, a fresnel lens sheet (which does not have an optical dispersing layer which is formed by optical dispersing agent for a base member, and haze is 0%) and a lenticular sheet (which is an H lens in which cylindrical lens groups are disposed in parallel in horizontal/vertical directions such that an optical dispersing layer is provided on the base member, and haze is 80%) are disposed from a projector to therefarther.

The structure for the cylindrical lens groups which are disposed in parallel in a vertical direction in the orthogonal lenses is called a V lens instead of the H lens. In FIGS. 15 and 16, the "lenticular lens (V)" and the "lenticular lens (H)" are itemized separately. These are formed unitarily so as to be described as cross lenticular lenses 1 and 2. Here, the cross lenticular lens 1 is designed such that a value of angle αV should be 10 degrees. Here, the cross lenticular lens 2 is designed such that a value of angle αV should be 20 degrees.

In the screen of the example 3-2, a fresnel lens sheet (which has an optical dispersing layer which is formed by optical dispersing agent for a base member, and haze is 60%) and a lens array sheet (which is an orthogonal lens which has the same optical characteristics as that in the example 3-1 which has an optical dispersing layer on the base member, and haze is 80%) are disposed from a projector to therefarther.

In the screen of the example 3-3, a fresnel lens sheet (which has an optical dispersing layer which is formed by optical dispersing agent for a base member, and haze is 60%) and a lens array sheet (which is an orthogonal lens which does not have the same optical characteristics as those in the examples 3-1 and 3-2 which have an optical dispersing layer on the base member, and haze is 80%) are disposed from a projector to therefarther.

According to these drawings, it is clearly understood that the samples according to the embodiments have more improved light distributing characteristics (which indicates a broadened perspective angle) in the vertical direction.

In the examples 3-1 to 3-3, any of half angle áV (a measured angle in which a brightness of an emitted light which is measured orthogonally from a front surface to a lens array sheet is as a half as the half angle which is measured in an offset manner from the orthogonal condition) by the V lens in the vertical direction is 35° or greater.

According to the drawing, it is understood that the optical distribution characteristics for not only the αV and δV but also βB and γV (measured angles in which a brightness of an emitted light which are measured orthogonally from a front surface to a lens array sheet are as ⅓, ⅒ respectively which is measured in an offset manner from the orthogonal condition) in the vertical direction are improved by the V lens function than in comparative examples (lower stages) which have more optical dispersing layers.

FIG. 16 is a table for comparing an optical characteristics which relates to a contrast in the above examples 3-1 to 3-3 and the comparative examples 1 and 2.

A difference for the contrast between the embodiments (300 to 330) and the comparative examples (220, 250) is outstanding in an observation condition which corresponds to a bright room under condition of 200 Lux or O Lux.

The vertical perspective angle is broadened by the optical dispersing layer in the comparative example; therefore, it is necessary to user more amount of optical dispersing agent. Therefore, the contrast is reduced by broadening the perspective angle; thus, a phenomenon occurs in which a reappearance characteristics for the image are deteriorated.

INDUSTRIAL APPLICABILITY

As explained above, in the first aspect of the present invention, it is possible to control an optical distribution characteristics in both the vertical direction and the horizontal direction for the light which transmits through the lens array layer. Therefore, it is possible to restrict a material cost and a manufacturing cost with compared to a case in which two layers such as lens array layers are used, or the lens layers are formed on both surfaces of the base member layer. Also, it is possible to avoid the optical absorption by the dispersing layer and the reduction of the gain by omitting or simplifying the dispersing layer 8. As a result, it is possible to restrict a white dispersion phenomenon which is caused by the dispersing layer so as to realize a high S/N ratio.

In the second aspect of the present invention, it is possible to improve the S/N ratio by disposing the shading layer; thus, it is possible to provide an image which has a desirable contrast.

In the third aspect of the present invention, the cross sectional shape of the cylindrical lens is aspherical; therefore, it is possible to reduce the aberration during a focusing operation and form the incident light in a fine pitch.

In the fourth aspect of the present invention, the lens layer in the lens array layer is formed by the radiation curable resin; therefore, it is possible to perform a forming operation in a fine pitch.

In the fifth aspect of the present invention, it is possible to provide a transparent screen which has the above effects by combining the lens array sheet and the fresnel lens which is described in any one of the first to fourth aspects.

In the fourth aspect of the present invention, the lens layer in the fresnel lens is formed by the radiation curable resin; therefore, it is possible to perform a forming operation in a fine pitch.

Also, it is possible to control the optical distribution characteristics (perspective angles) completely independently in the vertical direction and the horizontal direction for the light which transmits through the lens array sheet in the lens array sheet of the present invention by modifying the lens shapes for the first lens and the second lens. Such a fact indicates that it is possible to control the optical characteristics in the screen positively; thus, such a feature has a great effect for shortening the Research and Development period and reducing the cost.

Also, it is possible to set the perspective angles both in the vertical direction and the horizontal direction by a piece of the lens sheet desirably; therefore, there are effects such as 1) it is possible to reduce the cost for the forming operation greatly, 2) it is not necessary to develop/mix the material member because it is possible to set the amount (effect) of the optical dispersing agent according to a prepared material member, and 3) it is possible to restrict the optical absorption (a light amount loss); thus, it is possible to realize a bright screen easily.

Also, it is possible to reduce more optical dispersing agent than in a conventional case; therefore, the reflection dispersion of an external light is restricted; thus, the transparency is enhanced and an optical absorption operation in the shading layer increases. Thus, it is possible to realize an improved S/N ration which has not been realized in the conventional case.

As explained above, in the present invention, it is possible to control an optical distribution characteristics in both the vertical direction and the horizontal direction for the light which transmits through the lens array layer. Therefore, it is possible to restrict a material cost and a manufacturing cost with compared to a case in which two layers such as lens array layers are used, or the lens layers are formed on both surfaces of the base member layer.

In particular, in a case in which a perspective angle in the screen in the vertical direction in which a horizontal lencitular in which a shading layer is formed near a observing person is used, if an image light is transmitted through other lens element (vertical lenticular) before the image light is incident into the horizontal lenticular, the image light of which perspective angle is broadened by the other lens element is blocked (absorbed) by the shading layer in the horizontal lenticular. Therefore, it is desirable that the perspective angle should be broadened in a section of the lens element. Thus, the present invention is advantageous.

Also, it is possible to avoid the optical absorption by the dispersing layer and the reduction of the gain by omitting or simplifying the dispersing layer 8. As a result, it is possible to restrict a white dispersion phenomenon which is caused by the dispersing layer so as to realize a high S/N ratio.

Furthermore, in the present invention, the shape for the cylindrical lenses in the unit lenses 382H and 382V are not deteriorated as shown in FIGS. 13A amd 13B. According to this fact, it is understood that it is possible to maintain each inherent optical characteristics independently even if the optical characteristics for the first lens and the second lens are designed separately so as to unify both of them; thus, it is possible to control the perspective angle characteristics (optical distribution characteristics) in the horizontal/vertical direction easily.

In the present invention, a shading pattern (black matrix=BM) is formed according to a "self-alignment method" in which a light condensing section/non-light condensing section forms an aperture section/shading section according to a light condensing characteristics in the lens itself so as to realize a high shading ratio; thus, it is advantageous for improving the contrast.

What is claimed is:

1. A lens array sheet, comprising:
    a first surface formed by a first lens array and a second lens array formed unitarily and orthogonally with respect to each other, the first lens array being formed by a plurality of first half-columnar cylindrical lenses disposed in parallel without intervals therebetween, the second lens array being formed by a plurality of second half-columnar cylindrical lenses disposed in parallel without intervals therebetween; and
    a second surface, wherein
    cross sections formed by the first half-columnar cylindrical lenses and the second half-columnar cylindrical lenses are unit lenses each having four sets of convex lens portions disposed in a circle in plan view.

2. A lens array sheet according to claim 1, wherein a height of the first lens array is equal to a height of the second lens array.

3. A lens array sheet according to claim 1, wherein a height of the first lens array is different from a height of the second lens array.

4. A lens array sheet according to claim 1, wherein shading sections for blocking transmitting light are provided on a focal plane of the lens arrays.

5. A lens array sheet according to claim 1, wherein a cross section of each half-columnar cylindrical lens is aspherical.

6. A lens array sheet according to claim 1, wherein each lens array layer is formed by a base material layer and a lens layer which is disposed on a surface of the respective lens array layer, and the lens layer is formed by a radiation-curable resin.

7. A lens array sheet according to claim 1, wherein a light condensing surface on which light transmitted through the first lens array and the second lens array is focused is disposed outside of a light emitting plane of the lens array sheet, and is disposed opposite the lens arrays with respect to the light emitting plane.

8. A transparent screen, comprising:
    a lens array sheet according to claim 1; and
    a fresnel lens.

9. A transport screen according to claim 8, wherein the fresnel lens is formed by abase material layer and a lens layer which is formed on a surface of the base material layer, the lens layer being formed by a radiation-curable resin.

10. A rear-projection display device, comprising:
    a lens array sheet according to claim 1; and
    a fresnel lens.

* * * * *

UNITED STATES PATENT AND TRADEMARK OFFICE
CERTIFICATE OF CORRECTION

| | | |
|---|---|---|
| PATENT NO. | : 7,483,214 B2 | Page 1 of 1 |
| APPLICATION NO. | : 11/362006 | |
| DATED | : January 27, 2009 | |
| INVENTOR(S) | : Tsutomu Yoshida et al. | |

It is certified that error appears in the above-identified patent and that said Letters Patent is hereby corrected as shown below:

Column 1, Line 12, change "2001-369213," to --2001-369216,--.

Column 22, Line 31, change "transport" to --transparent--.

Column 22, Line 32, change "abase" to --a base--.

Signed and Sealed this

Second Day of June, 2009

JOHN DOLL
*Acting Director of the United States Patent and Trademark Office*